US011610054B1

(12) United States Patent
Aggarwal et al.

(10) Patent No.: US 11,610,054 B1
(45) Date of Patent: Mar. 21, 2023

(54) SEMANTICALLY-GUIDED TEMPLATE GENERATION FROM IMAGE CONTENT

(71) Applicant: Adobe Inc., San Jose, CA (US)

(72) Inventors: Vinay Aggarwal, New Delhi (IN); Vishwa Vinay, Bangalore (IN); Rizurekh Saha, Kolkata (IN); Prabhat Mahapatra, Ghaziabad (IN); Niyati Himanshu Chhaya, Hyderabad (IN); Harshit Agrawal, Navi Mumbai (IN); Chloe McConnell, Berkeley, CA (US); Bhanu Prakash Reddy Guda, Ongole (IN); Balaji Vasan Srinivasan, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/450,250

(22) Filed: Oct. 7, 2021

(51) Int. Cl.
| | |
|---|---|
| *G06F 40/186* | (2020.01) |
| *G06F 40/109* | (2020.01) |
| *G06K 9/62* | (2022.01) |
| *G06F 40/30* | (2020.01) |
| *G06N 20/00* | (2019.01) |

(52) U.S. Cl.
CPC ......... *G06F 40/186* (2020.01); *G06F 40/109* (2020.01); *G06F 40/30* (2020.01); *G06K 9/6269* (2013.01); *G06N 20/00* (2019.01)

(58) Field of Classification Search
CPC ...... G06F 40/186; G06F 40/109; G06F 40/30; G06K 9/6269; G06N 20/00

USPC .......................................................... 715/235
See application file for complete search history.

(56) References Cited

U.S. PATENT DOCUMENTS

| | | | | |
|---|---|---|---|---|
| 8,438,163 | B1* | 5/2013 | Li | G06V 30/242 |
| | | | | 707/706 |
| 10,430,512 | B1* | 10/2019 | Pedersen | G06F 40/30 |
| 2017/0220587 | A1* | 8/2017 | Srinivasan | G06F 40/106 |
| 2018/0081874 | A1* | 3/2018 | Zelenkov | G06F 40/284 |
| 2019/0034483 | A1* | 1/2019 | Millius | G06N 20/00 |
| 2019/0079925 | A1* | 3/2019 | Wang | G06F 40/279 |
| 2020/0004804 | A1* | 1/2020 | Srinivasan | G06F 40/186 |
| 2020/0159871 | A1* | 5/2020 | Bowen | G06T 11/001 |
| 2021/0224858 | A1* | 7/2021 | Khoury | G06Q 30/0203 |
| 2022/0114289 | A1* | 4/2022 | Te | G06N 20/00 |
| 2022/0138514 | A1* | 5/2022 | Hall | G06V 30/274 |
| | | | | 382/224 |

OTHER PUBLICATIONS

Bianco et al. Deep Learning for Logo Recognition; Jan. 10, 2017; Neurocomputing 245; pp. 1-10.*

(Continued)

*Primary Examiner* — Andrew R Dyer
(74) *Attorney, Agent, or Firm* — Weaver Austin Villeneuve & Sampson LLP

(57) ABSTRACT

Techniques for template generation from image content includes extracting information associated with an input image. The information comprises: 1) layout information indicating positions of content corresponding to a content type of a plurality of content types within the input image; and 2) text attributes indicating at least a font of text included in the input image. A user-editable template having the characteristics of the input image is generated based on the layout information and the text attributes.

18 Claims, 12 Drawing Sheets

(56) References Cited

OTHER PUBLICATIONS

Oliveira et al.; Automatic Graphic Logo Detection via Fast Region-based Convolutional Networks; Apr. 20, 2016; Proc. International Joint Conference on Neural Networks (IJCNN); pp. 1-7.*

Liu et al.; Intelligent design of multimedia content in Alibaba; 2019; Frontiers of Information Technology & Electronic Engineering; pp. 1657-1664.*

Zheng et al.; Content-aware Generative Modeling of Graphic Design Layouts; Jul. 2019; Association for Computing Machinery; vol. 34; No. 4; Article 133; pp. 1-15.*

Yue Su, A parallel computing and mathematical method optimization of CNN network convolution; Dec. 2, 2020; Microprocessors and Microsystems; pp. 1-7.*

Mougenot, Céline, et al., "Inspiration, images and design: an investigation of designers' information gathering strategies", *J. of Design Research*, 7(4):331-351, 2008 <DOI: 10.1504/JDR.2008. 026987>.

He, Kaiming, et al., "Mask R-CNN", *Proc. IEEE International Conference on Computer Vision (ICCV)*, 2961-2969, 2017 <DOI: 10.1109/ICCV.2017.322>.

Redmon, Joseph, et al., "YOLO9000: Better, Faster, Stronger", *Proc. IEEE Conference on Computer Vision and Pattern Recognition (CVPR)*, 7263-7271, 2017 <DPO: 10.1109/CVPR.2017.690>.

Ronneberger, Olaf, et al., "U-net: Convolutional Networks for Biomedical Image Segmentation", Medical Image Computing and Computer-Assisted Intervention (MICCAI 2015), *Lecture Notes in Computer Science*, vol. 9351, 234-241, Springer International Publishing Switzerland, 2015.

Krishna, Ranjay, et al., "Visual Genome: Connecting Language and Vision Using Crowdsourced Dense Image Annotations", *International Journal of Computer Vision*, 123(1):32-73, 2017.

Zhao, Hengshuang, et al., "Pyramid Scene Parsing Network", *Proc. IEEE Conference on Computer Vision and Pattern Recognition (CVPR)*, 2881-2890, 2017 <DOI: 10.1109/CVPR.2017.660>.

Paleček, Karel, "Deep Learning for Logo Detection", *Proc. 42$^{nd}$ International Conference on Telecommunications and Signal Processing (TSP)*, 609-612, 2019 <DOI: 10.1109/TSP.2019.8769038>.

Maheshwari, Paridhi, et al., "Exemplar Based Experience Transfer", *Proc. of the 24th International Conference on Intelligent User Interfaces (IUI '19)*, Assoc. for Computer Machinery, 673-680, 2019 <DOI: 10.1145/3301275.3302300>.

Smith, Ray, "An Overview of the Tesseract OCR Engine", *Proc. of the Ninth International Conference on Document Analysis and Recognition (ICDAR)*, vol. 2, 629-633, 2007 <DOI: 10.1109/ICDAR. 2007.4376991>.

Vempati, Sreekanth, et al., "Enabling Hyper-Personalisation: Automated Ad Creative Generation and Ranking for Fashion e-Commerce", *Proc. 13$^{th}$ Conference on Recommender Systems*, 2019, pp. 1-10 <URL: https://arxiv.org/abs/1908.10139v1>.

He, Kaiming, et al., "Deep Residual Learning for Image Recognition", 2015, pp. 1-12 <URL: https://arxiv.org/abs/1512.03385v1>.

Xie, Saining, et al., "Aggregated Residual Transformations for Deep Neural Networks", *Proc. IEEE Conference on Computer Vision and Pattern Recognition (CVPR)*, 2017, pp. 1-10 <URL: https://arxiv.org/abs/1611.05431v2>.

Sandler, Mark, et al., "MobileNetV2: Inverted Residuals and Linear Bottlenecks", 2019, pp. 1-14 <URL: https://arxiv.org/abs/1801. 04381v4>.

Lin, Tsung-Yi, et al., "Feature Pyramid Networks for Object Detection", 2017, pp. 1-10 <URL: https://arxiv.org/abs/1612.03144v2>.

Deng, Jia, et al., "ImageNet: A Large-Scale Hierarchical Image Database", *Proc. IEEE Conference on Computer Vision and Pattern Recognition (CVPR)*, 2009, pp. 1-8 <DOI: 10.1109/CVPR.2009. 5206848>.

Redmon, Joseph, et al., "You Only Look Once: Unified, Real-Time Object Detection", 2016, pp. 1-10 <URL: https://arxiv.org/abs/1506. 02640v5>.

Redmon, Joseph, et al., "YOLOv3: An Incremental Improvement", 2018, pp. 1-6 <URL: https://arxiv.org/abs/1804.02767v1>.

Ren, Shaoqing, et al., "Faster R-CNN: Towards Real-Time Object Detection with Region Proposal Networks", 2016, pp. 1-14 <URL: https://arxiv.org/abs/1506.01497v3>.

Wang, Zhangyang, "DeepFont: Identify Your Font from An Image", *Proc. of the 23$^{rd}$ ACM International Conference on Multimedia*, 2015, pp. 1-9 <DOI: <10.1145/2733373.2806219>.

* cited by examiner

SEMANTICALLY-GUIDED TEMPLATE GENERATION FROM IMAGE CONTENT

BACKGROUND

Computer-implemented content creation applications generally lack the capability to generate a template that emulates the style and characteristics of an existing work that makes the existing work effective as a banner. For example, some computer-implemented content creation applications are able to identify basic objects within an existing image and generate a layout based on the locations of those object. However, such content creation applications are not able to extract semantically meaningful information from the existing image that, in aggregate, yields the style of the existing image to be emulated. For instance, such content creation applications are not able to extract logos, textual characteristics such as typography, size, and color, and the actual written content from the existing work. Often times, it is the combination and interaction of these stylistic elements that makes a banner effective in communicating the information intended to be conveyed by the banner. Moreover, because it is difficult to identify and isolate specific characteristics that makes a banner effective, it is difficult to manually create a template that properly mimics the style of an effective banner.

SUMMARY

In some embodiments, a computing system for template generation includes an input/output module, a layout extraction module, a font extraction module, a logo extraction module, and a template extraction module. The input/output module is configured to obtain a user-selected input image including contents of different content types from a user. The layout extraction module is configured to generate layout information including a position and a content type of each pieces of content within the input image. The font extraction module is configured to process multiple text regions in the input image in parallel to generate text attributes indicating at least a font of text included in each of the text regions. The logo extraction module is configured to generate logo information indicating a position of each logo included in the input image. The template extraction module is configured to generate a template using the layout information, the text attributes, and the logo information to create editable regions including editable text regions tagged with the text attributes and editable logo regions. The generated template provides a baseline to generate an image that emulates characteristics of the input image.

BRIEF DESCRIPTION OF THE DRAWINGS

Like reference numbers and designations in the various drawings indicate like elements.

DETAILED DESCRIPTION OF EMBODIMENTS

Term Definitions

Figure 1:
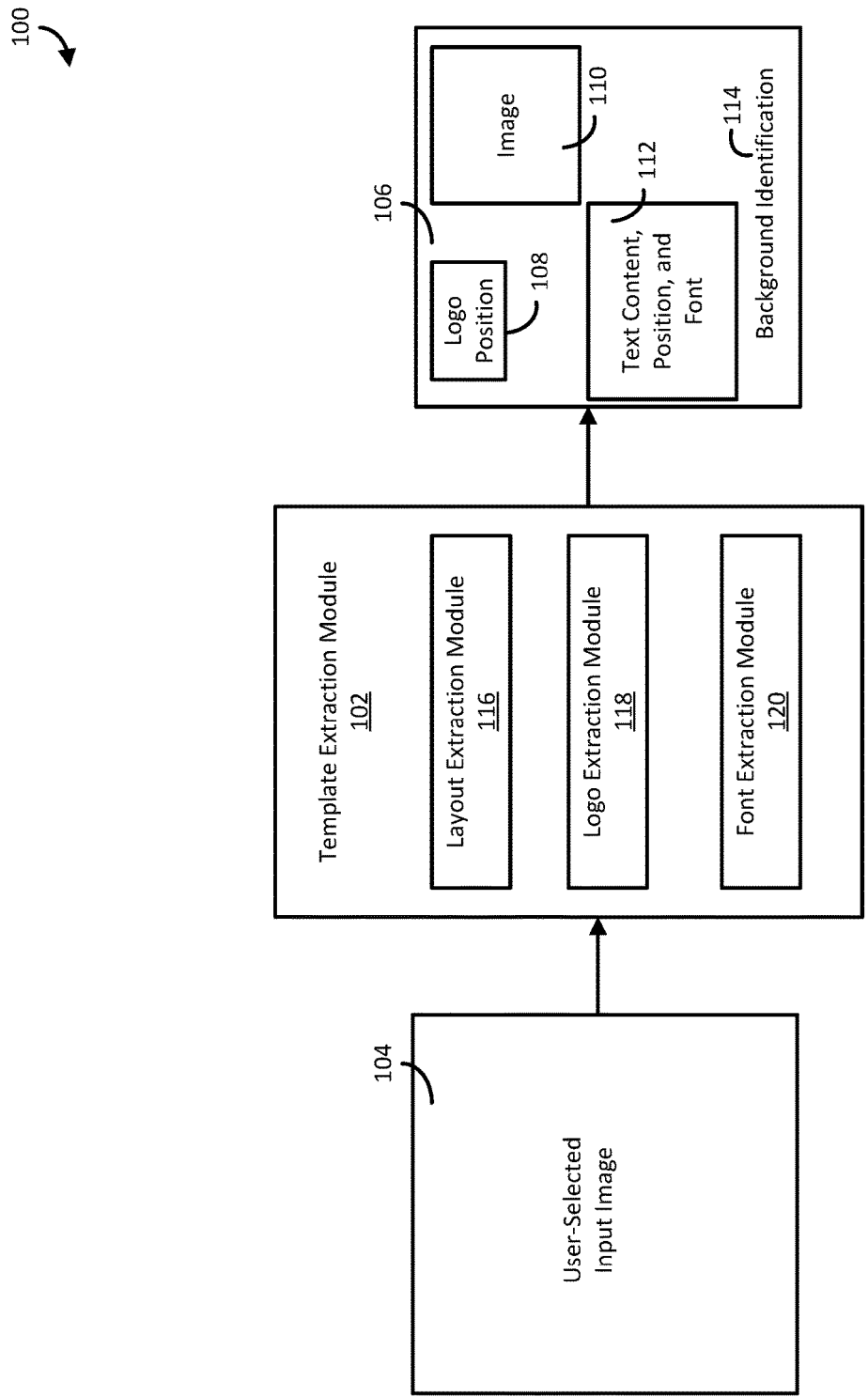
FIG. 1 shows an example of a system for extracting templates from images in accordance with some embodiments.

As used herein, a "template" refers to an underlying structure of an image. For example, in one embodiment, a template indicates a layout of the image (e.g., positions at which text is located in the image, positions at which logos are located in the image, or the like), and/or information associated with content of the image (e.g., an identification of one or more text colors, an identification of one more background colors, an identification of a rotation of text or an image included in the image, an identification of a font associated with text included in the image, or the like). In one embodiment, a template is stored in a data structure, such as JSON structure or an XML structure. A template enables a user to create a second image having similar style characteristics as the image from which the template is extracted.

As used herein, a "layout" refers to information indicating positions and/or sizes of different types of content or classes of content within an image. In one example, a layout indicates positions and/or sizes of one or more logos, positions of one or more blocks of text, positions of one or more images, positions of one or more shapes, or the like. In one embodiment, a layout indicates whether a particular content item is foreground content or background content. In one example, a position and/or size of a particular content item is indicated within a layout as a position of a particular pixel corresponding to the content item (e.g., top-left pixel, bottom-left pixel, or the like) and a width and height of the content item. In another example, a position and/or size of a particular content item is indicated in a layout by pixels of corners (e.g., four corners) of the content item.

As used herein, a "logo" refers to a symbol, icon, text, or other content included within an image indicating a particular brand or entity. In one embodiment, a logo has a small size (e.g., occupying a relatively small portion of an image). In another embodiment, a logo has a medium or large size (e.g., occupying a larger portion of an image).

As used herein, a "banner" refers to an image that combines both visual and textual elements along with a common intent. For example, in one embodiment, a banner is an ensemble of an intent, a theme, a collection of images, affiliated text phrases, and additional elements such as logo, shapes, and textures to convey certain information.

As used herein, a "machine learning model" refers to a computational algorithm that indicates relationships between input variables and output variables. In one embodiment, a machine learning model is trained. Training a machine learning model involves determining values of weights associated with the machine learning model, where relationships between the input variables and the output variables are based at least in part on the determined weight values. In one example, a machine learning model is trained in a supervised manner using a training set that includes labeled training data. In a more particular example, the labeled training data includes inputs and manually-annotated outputs that the machine learning model is to approximate using determined weight values. In another embodiment, a machine learning model is trained in an unsupervised manner in which weight values are determined without manually-labeled training data.

As used herein, a "module" refers to a portion of computer-executable instructions. In one embodiment, a module is implemented by a hardware processor, which executes the corresponding computer-executable instructions. A hardware processor is an integrated circuit device associated with a computing device, such as a server or a user device (e.g., a desktop computer, a laptop computer, a tablet computer, a mobile phone, or the like), which is programmable to perform specific tasks. In one embodiment, multiple modules are implemented as a single module. In one embodiment, a single module is implemented as multiple modules. In one embodiment, two or more modules are executed by the same device (e.g., the same server, the same computing device, etc.).

Template Generation from Image Content

The techniques disclosed herein provide a template generation application capable of creating a template based on a user-selected input image. Conventional image templates are usually generated manually and does not allow a user to select an existing image to base the template off of. In contrast, the template generation application is able to take as input a particular image that a user finds to be aesthetically pleasing or effective in conveying a certain idea or message, and create a user-editable template that emulates the style and characteristics of that input image. The generated template has a similar layout as the user-selected input image (e.g., positions of various types of content), and includes text attributes extracted from text regions in the user-selected input image as well as positions of logos included in the user-selected input image. The generated template provides the user with a baseline to create a new image or a final image having a style taken from the user-selected input image.

The template generation application integrates different machine learning models to analyze the user-selected input image in a single processing pipeline. By using a single processing pipeline, the template generation application is able to create a template in response to a single user command (e.g., one click) without having to invoke different applications to process the user-selected input image. The image/template data being processed also do not have to be copied to or from different memory spaces allocated for different applications. Eliminating such memory accesses and invocations of different applications reduces the processing latency and speeds up execution time. This also allows a more efficient use of the system's memory and computing resources.

Moreover, the single processing pipeline also allows for parallel processing of various elements. For example, the template generation application integrates a layout extraction module, a font extraction module, and a logo extraction module in the single processing pipeline. The layout extraction module performs semantic segmentation on the user-selected image to identify regions having different content types (e.g., shapes, text, images, etc.). Once the layout extraction module has identified text regions and image regions, these regions are processed in parallel by the text extraction model and/or the logo extraction module. This further reduces the processing time as compared to conventional techniques because processing each region using conventional techniques require the different applications for the different tasks to be invoked serially.

Furthermore, the template generation application also provides additional improvements in the layout extraction module and the font extraction module. With respect to the layout extraction module, unlike conventional segmentation techniques which produce highly pixelated regions when performing semantic segmentation on an image, the layout extraction module generates smoothed regions by discarding regions of pixels that are less than a certain threshold size. This allows further processing on the various regions to be performed more quickly and uses less computational resources, because small regions (e.g., a shadow, pixilation due to artifacts or poor resolution) that are erroneously identified as belonging to a certain content type are discarded and are not processed further.

As for the font extraction module, the text regions identified from the input image are pre-processed by the font extraction module to conform the text regions into a form that is similar to the training images that were used to train the font extraction machine learning model. For example, each text region is superimposed on a white background because the machine learning model was trained using images with text on white background. As another example, the aspect ratio of text to background of each text regions is adjusted to be similar to the training images. Such preprocessing allows the font extraction module to more accurately and more efficiently perform character recognition and font identification.

FIG. 1 shows an example of a system 100 for generating a template associated with an image in accordance with one embodiment. As illustrated, system 100 includes a template extraction module 102 that takes, as an input, a user-selected input image 104 (e.g., a banner), and generates, as an output, a template 106. In one embodiment, user-selected input image 104 is a flat image (e.g., a Joint Photographic Experts Group (JPEG) image, a Graphics Interchange Format (GIF) image, a Portable Network Graphics (PNG) image, and/or any other suitable format). In one embodiment, template 106 includes information indicating content of user-selected input image 104, such as inclusion of and/or positions of logos included in user-selected input image 104, inclusion of and/or positions of images included in user-selected input image 104, inclusion of and/or positions of text included in user-selected input image 104, content of and/or a font associated with text included in user-selected input image 104, attributes of a background of user-selected input image 104, or the like. In the example shown in FIG. 1, template 106 includes logo attributes 108, image attributes 110, text attributes 112, and background attributes 114. In one embodiment, template 106 comprises a data structure (e.g., a JSON data structure, an XML data structure, or the like) that indicates positions of various types of content included in user-selected input image 104 and/or attributes of the various types of content included in user-selected input image 104. Examples of types of content include images, text, and/or shapes. In one embodiment, template 106 enables another image to be created that has at least a portion of the characteristics of user-selected input image 104, as shown in and described below in more detail in connection with FIG. 2.

In one embodiment, template extraction module 102 is implemented on a user device (e.g., a desktop computer, a laptop computer, a tablet computer, or the like). In one embodiment, template extraction module 102 is implemented on a server. For example, in one embodiment, template extraction module 102 is implemented on a server that receives user-selected input image 104 and/or an indication of user-selected input image 104 from a user device that communicates with the server (e.g., via the Internet or other communications network).

In one embodiment, template extraction module 102 includes a layout extraction module 116. Layout extraction module 116 is configured to identify types of content included in user-selected input image 104 and/or positions of various types of content included in user-selected input image 104. In one example, layout extraction module 116 is configured to determine that an image is located at a particular position within user-selected input image 104 and/or has a particular size. In another example, layout extraction module 116 is configured to determine that text content is located at a particular position within user-selected input image 104 and/or occupies a particular portion of user-selected input image 104. In one embodiment, layout extraction module 116 is configured to determine whether a particular type of content included in user-selected input image 104 is foreground content or background content. More detailed description associated with layout extraction module 116 is provided below in connection with FIGS. 3A, 3B, and 7.

In one embodiment, template extraction module 102 includes a logo extraction module 118. Logo extraction module 118 is configured to determine whether user-selected input image 104 includes one or more logos, and, if user-selected input image 104 includes one or more logos, the positions of each logo. More detailed description associated with logo extraction module 118 is provided below in connection with FIGS. 4A, 4B and 8.

In one embodiment, template extraction module 102 includes font extraction module 120. In one embodiment, font extraction module 120 is configured to determine content of each text portion included in user-selected input image 104. Additionally or alternatively, font extraction module 120 is configured to identify font attributes and/or text attributes associated with each text portion included in user-selected input image 104. Examples of font attributes and/or text attributes include a font identifier (e.g., Times New Roman, Arial, Century Gothic, or the like), a font size (e.g., 12 point, 18 point, 24 point, or the like), a text format (e.g., that the text includes all capital letters, all lower-case letters, or the like), a text color, etc. More detailed description associated with font extraction module 120 is provided below in connection with FIGS. 5 and 9.

It should be noted that, in one embodiment, logo extraction module 118 and font extraction module 120 operate substantially in parallel. In one embodiment, logo extraction module 118 and/or font extraction module 120 utilize information generated by layout extraction module 116. In one example, layout extraction module 116 generates a coarse template that indicates locations of various types of content, such as regions that include text content, regions that include image content, etc. Logo extraction module 118 is then provided with the regions that includes image content to determine whether or not the region includes a logo, and in parallel, font extraction module 120 is provided the regions that include text content to identify text attributes associated with the regions (e.g., content of the text, a font of the text, formatting of the text, etc.).

In one embodiment, a user-selected image is provided via a user interface. In one example, the user interface includes user interface controls that allow a user to select or indicate a particular user-selected image. As a more particular example, the user-selected image is selected by the user from local memory of a device. As another example, a link to the user-selected image is provided via the user interface. In one embodiment, a structured image, generated based on a template extracted from the user-selected input image, is provided (e.g., via the user interface). The structured image includes extracted content from the user-selected input image, and is made editable to allow further modifications to be made to the structured image. For example, in an instance in which the user-selected input image includes a logo, the structured image also includes the logo, which is selectable and/or editable (e.g., deleted, resized, etc.). As another example, in an instance in which the user-selected input image includes text content, the structured image also includes the text content having the same attributes as the text content in the user-selected input image (e.g., the same text content, the same font, the same font size, etc.). Similarly, the text content (e.g., the alphanumeric characters, font, font size, color, etc.) in the structured image is editable.

It should be noted that, in one embodiment, the user interface is presented via an application installed locally on a user device. Alternatively, in one embodiment, the user interface is presented via an application or web browser such that content provided by the user interface is provided via a server to the user device.

Figure 2:
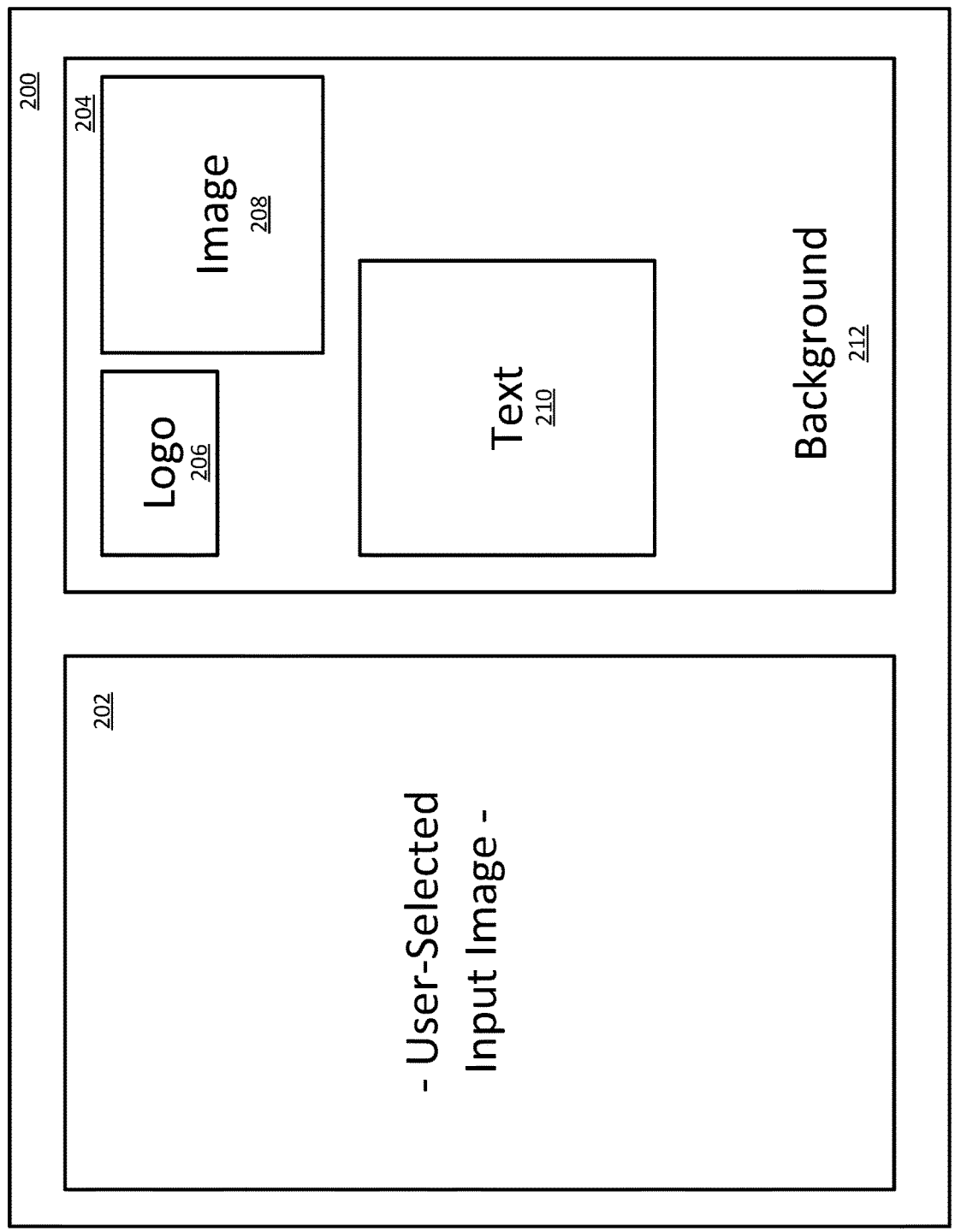
FIG. 2 shows an example user interface for extracting and providing template information in accordance with some embodiments.

FIG. 2 shows an example of a user interface 200 for providing a structured image based on a template generated from a user-selected input image in accordance with one embodiment. As illustrated, user interface 200 includes a display area 202 that indicates a user-selected input image. The user-selected input image is selected by a user (e.g., a user of user interface 200), for example, from the local memory of a device presenting user interface 200, from a remote server, from an image provisioning service, from a social networking service, etc. In one embodiment, the user-selected input image is provided as an image, or a link to an image. In one embodiment, user interface 200 includes a user interface control (e.g., a push button) that, when selected, causes a user interface to select and/or navigate to a particular image to be selected as the user-selected input image to be presented in display area 202. In one embodiment, user interface 200 also includes user interface controls to edit the user-selected input image (e.g., to crop user-selected input image, to convert a color image to a black and white image, etc.). It should be noted that, in one embodiment, the user-selected input image is a flat image (e.g., the user-selected input image does not include content layer information).

As illustrated, user interface 200 includes a structured image 204 that is generated based on a template extracted from the user-selected input image. In one embodiment, the template is extracted using a template extraction module, such as template extraction module 102 as shown in and described above in connection with FIG. 1. Techniques for extracting the template and/or generating structured image 204 are shown in and described below in connection with FIG. 6. As illustrated, structured image 204 includes a logo portion 206, an image portion 208, a text portion 210, and a background portion 212. Each of logo portion 206, image portion 208, text portion 210, and background portion 212 include content identified from the user-selected input image. For example, in one embodiment, logo portion 206 includes a logo identified in user-selected input image. As another example, image portion 208 includes an image identified in user-selected input image. As yet another example, text portion 210 includes text identified in the user-selected input image. In one embodiment, each of logo portion 206, image portion 208, and text portion 210 is presented at a position and/or having a size corresponding to the corresponding content as included in the user-selected input image. For example, in an instance in which the user-selected input image includes an image having a top-left corner at pixel (256, 400), and has a size of 100 pixels×100 pixels, structured image 204 includes image portion 208 positioned within structured image 204 such that a top-left corner of image portion 208 is positioned at pixel (256, 400), and such that image portion 208 has a size of 100 pixels×100 pixels. In one embodiment, text portion 210 includes the content of the text included in the user-selected input image, positioned at the same position as the text included in the user-selected input image, and having the same text attributes (e.g., font, font size, font format, etc.) as the text included in the user-selected input image.

In one embodiment, each of logo portion 206, image portion 208, text portion 210, and/or background portion 212 is editable within user interface 200. In one example, logo portion 206, image portion 208, and/or text portion 210 is resizable (e.g., to be bigger, smaller, taller, wider, shorter, narrower, etc.). As another example, logo portion 206, image portion 208, and/or text portion 210 is removable. In yet another example, text included in text portion 210 is editable (e.g., editable in terms of content, editable in terms of font, editable in terms of font size, etc.). In one embodiment, structured image 204 provides individually extracted elements of the user-selected input image, which are then editable by the user within user interface 200 to generate a modified image. In one embodiment, the modified image is saved (e.g., locally in memory of a device that presents user interface 200, in memory associated with a remote server, or the like). In one embodiment, the modified image is provided (e.g., transmitted) to a third-party service, such as a social networking service, an image provisioning service, or the like. In one example, user interface 200 includes a "share" button, that, when selected, causes the modified image to be shared in association with a user account associated with a particular social networking service.

In one embodiment, a layout is extracted from a user-selected input image. An extracted layout includes identifications of particular classes of content included within the user-selected input image, positions and/or sizes of various types of content included within the user-selected input image, and/or whether particular types of content included within the user-selected input image are background content or foreground content. In one embodiment, the layout is extracted by performing semantic segmentation on the user-selected input image to classify pixels of the user-selected input image as belonging to a particular type of content (e.g., image content, text content, shape content, and/or background content). Continuing with this example, bounding boxes are then determined based on adjacent groups of pixels classified as belonging to the same type of content. Alternatively, the layout is extracted using a trained machine learning model that performs object identification on the user-selected input image.

Figure 3A:
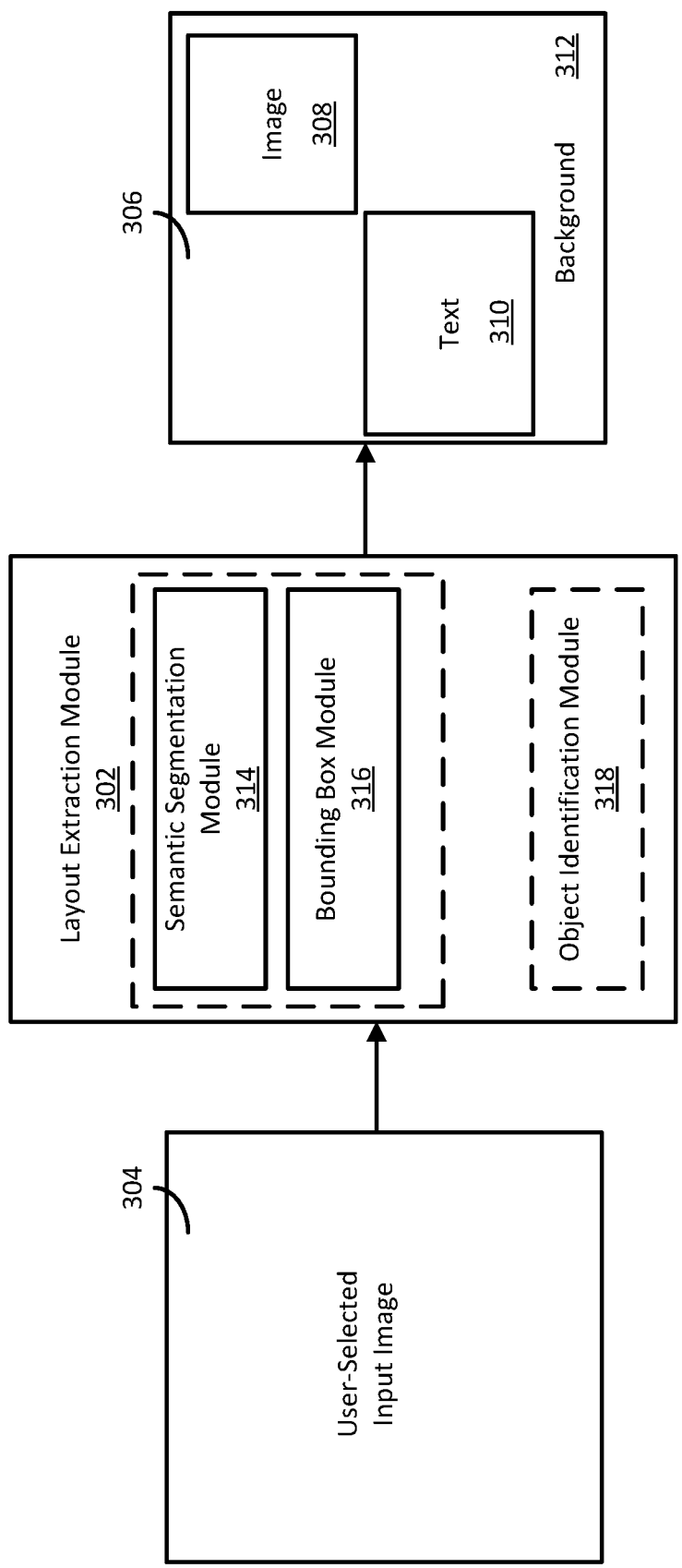
FIGS. 3A and 3B show schematic diagrams for use of a layout extraction module to extract a layout of an image in accordance with some embodiments.

FIG. 3A shows an example of a layout extraction module 302 for extracting a layout 306 associated with a user-selected input image 304. As illustrated, layout 306 includes an image portion 308, a text portion 310, and a background portion 312. Image portion 308 and text portion 310 indicate a size and/or a position of corresponding image content and text content, respectively, within user-selected input image. Background portion 312 indicates a portion of user-selected input image 304 that is not associated with image content, text content, logo content, and/or miscellaneous shape content.

In one implementation, layout extraction module 302 includes a semantic segmentation module 314 and a bounding box module 316. Semantic segmentation module 314 is configured to perform semantic segmentation on user-selected input image 304. In one example, semantic segmentation module 314 classifies pixels of user-selected input image 304 as belonging to a particular class of content. Example classes of content include text content, image content, shape content, and/or background content. In one embodiment, semantic segmentation module 314 generates a segmented image such that each pixel in the segmented image is assigned a classification corresponding to the content class determined by semantic segmentation module 314. In one example, a group of pixels that are adjacent to each other within the segmented image and have been assigned the same class are considered as belonging to the same object (e.g., to the same text box, etc.). In one embodiment, semantic segmentation module 314 is implemented as a trained machine learning model. In one example, the trained machine learning model is an encoder-decoder network that takes, as an input, the user-selected input image and generates, as an output, the segmented image. An example architecture of such a trained machine learning model is shown in and described below in connection with FIG. 3B.

In one embodiment, bounding box module 316 takes an output of semantic segmentation module 314 (e.g., a segmented image) and generates bounding boxes based on groups of pixels assigned to the same content class based on proximity of the pixels. For example, bounding box module 316 performs a depth first search (DFS) to identify a bounding box corresponding to a particular element included in user-selected input image. Use of DFS allows smoother segmented boundaries. In one embodiment, regions having an area less than a predetermined threshold (e.g., less than 800 pixels, less than 1000 pixels, less than 1200 pixels, etc.) are discarded, thereby yielding a cleaner and smoother segmented image. In one example, bounding box module 316 identifies a bounding box for a block of text included in user-selected input image 304. In another example, bounding box module 316 identifies a bounding box for an image included in user-selected input image 304. More detailed techniques for performing semantic segmentation on a user-selected input image and identifying bounding boxes based on the segmented image are shown in and described below in connection with FIG. 7.

In another implementation, layout extraction module 302 includes an object identification module 318 that directly identifies positions of objects (e.g., blocks of text, shapes, images, icons, etc.) included in user-selected input image 304. In one embodiment, object identification module 318 is implemented as a trained machine learning model. Example architectures of such a trained machine learning model include a recurrent convolutional neural network (RCNN), a fully convolutional neural network (FCNN), or the like. In one example, the trained machine learning model is based on the You Only Look Once (YOLO) model, e.g., YOLO, YOLOv2, YOLOv3, or the like.

Figure 3B:
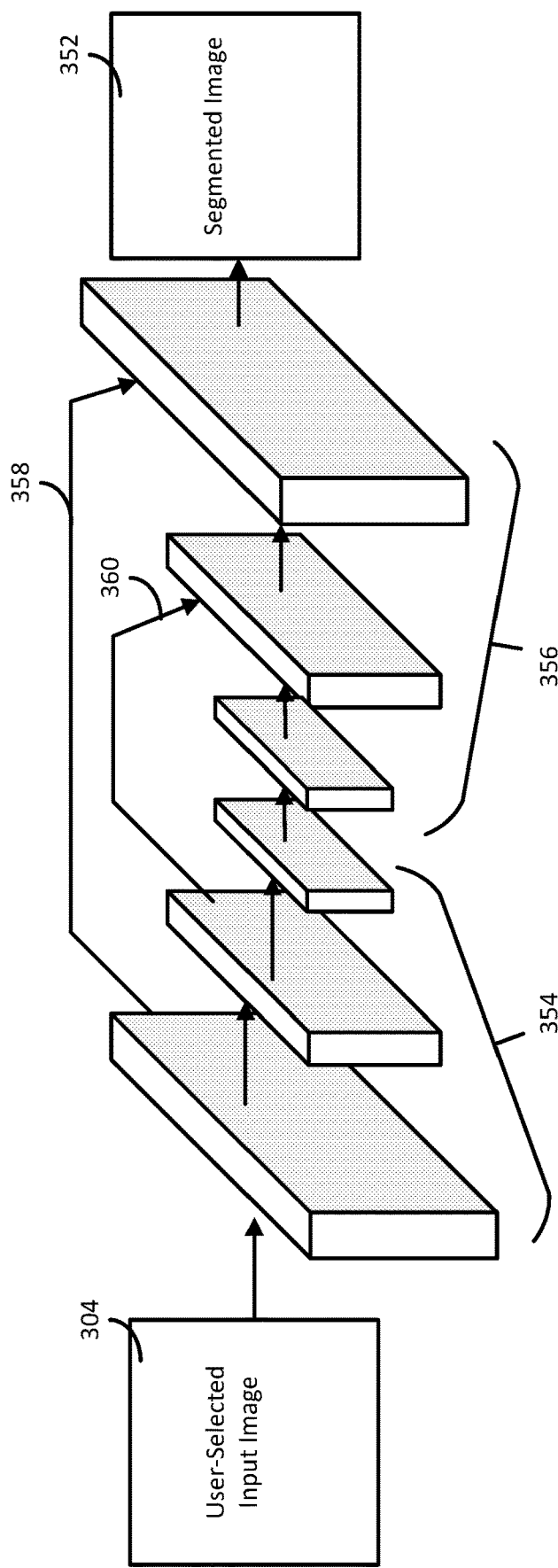

FIG. 3B shows an example of an encoder-decoder architecture that is used for performing semantic segmentation on user-selected input image 304 to generate a segmented image 352. It should be noted that the architecture illustrated in FIG. 3B is simplified (e.g., with a reduced number of layers, connections, etc.). As illustrated, the encoder-decoder architecture has an encoder network 354 and a decoder network 356. In one embodiment, encoder network 354 acts as a feature extraction network. For example, encoder network 354 includes multiple layers (e.g., convolutional layers, down-sampling layers, pooling layers, etc.) that extract features from user-selected input image 304 at different scales. In one embodiment, decoder network 356 acts as a feature fusion network that generates segmentation masks based on the features extracted by encoder network 354 and, at a final layer of decoder network 356, generates segmented image 352. For example, decoder network 356 includes multiple layers (e.g., convolutional layers, up-sampling layers, pooling layers, etc.) and generates segmented image 352 based on features extracted by encoder network 354. In one embodiment, encoder network 354 and decoder network 356 are different trained machine learning models (e.g., having different architectures and/or trained using different training sets). In one example, encoder network 354 is a ResNet50 network. Continuing with this example, in one embodiment, encoder network 354 is pre-trained using, for example, the ImageNet dataset. Another example of an encoder network is MobileNet. In one example, decoder network 356 is a Feature Pyramid Network (FPN). Other examples of decoder networks include a UNET, a PSPNet, or the like. As illustrated, outputs from down-sampling layers of encoder network 354 are passed to corresponding up-sampling layers of decoder network 356 via connections 358 and 360.

Figure 4A:
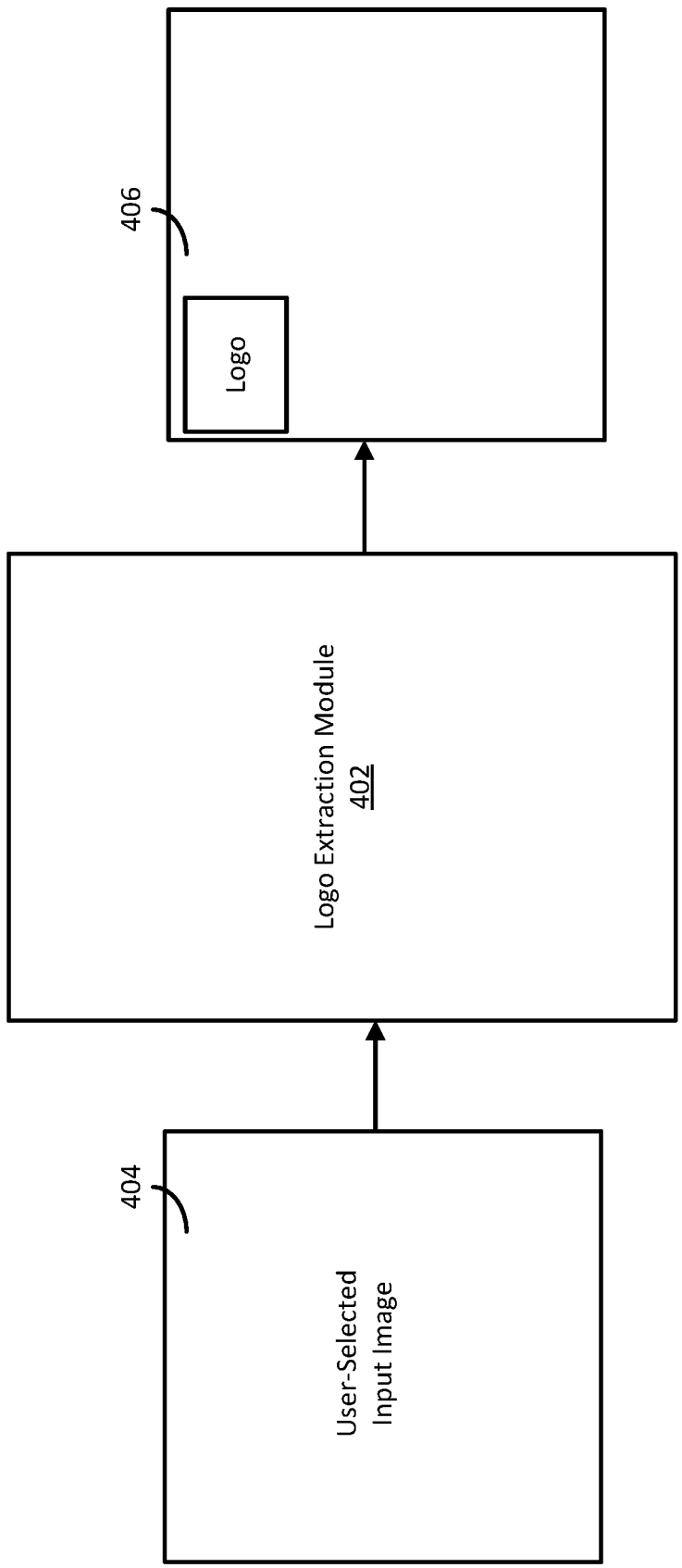
FIGS. 4A and 4B show schematic diagrams for use of a logo extraction module to extract a logo included in an image in accordance with some embodiments.

In one embodiment, an extracted template includes logo information, such as an indication of a presence and/or position of each of one or more logos included in a user-selected input image. In one embodiment, a logo is identified using a logo extraction module, e.g., logo extraction module 118 of FIG. 1. FIG. 4A shows an example of use of a logo extraction module 402 in accordance with one embodiment. As illustrated, logo extraction module 402 takes, as an input, a user-selected input image 404, and generates, as an output, logo information 406. In one embodiment, logo information 406 includes position information associated with a logo identified in user-selected input image 404. In one example, the position information includes rectangular coordinates indicative of boundaries of the logo identified in user-selected input image 404.

In one embodiment, the logo information is extracted or determined (e.g., by logo extraction module 402 of FIG. 4A) using a trained machine learning model. For example, a user-selected input image is provided to the trained machine learning model as an input, and a logo instance identified by the trained machine learning model within the user-selected input image is provided by the trained machine learning model as an output. In one embodiment, such a machine learning model is an FCNN (e.g., DarkNet, YOLO, YOLOv2, YOLOv3, or the like). In one embodiment, the trained machine learning model identifies logos and/or predicts logo positions at multiple pixel scales. In one example, the trained machine learning model is a YOLOv3 architecture that identifies logos and/or predicts logo positions at three different pixel scales by down-sampling an input user-selected input image to the three different pixel scales. In one particular example, the user-selected input image is down-sampled by a factor of 32, 16, and 8, respectively, for prediction on each pixel scale. By performing logo detection at multiple pixel scales, small, medium, and/or large logos are advantageously detected within the user-selected input image at each of the various pixel scales.

Figure 4B:
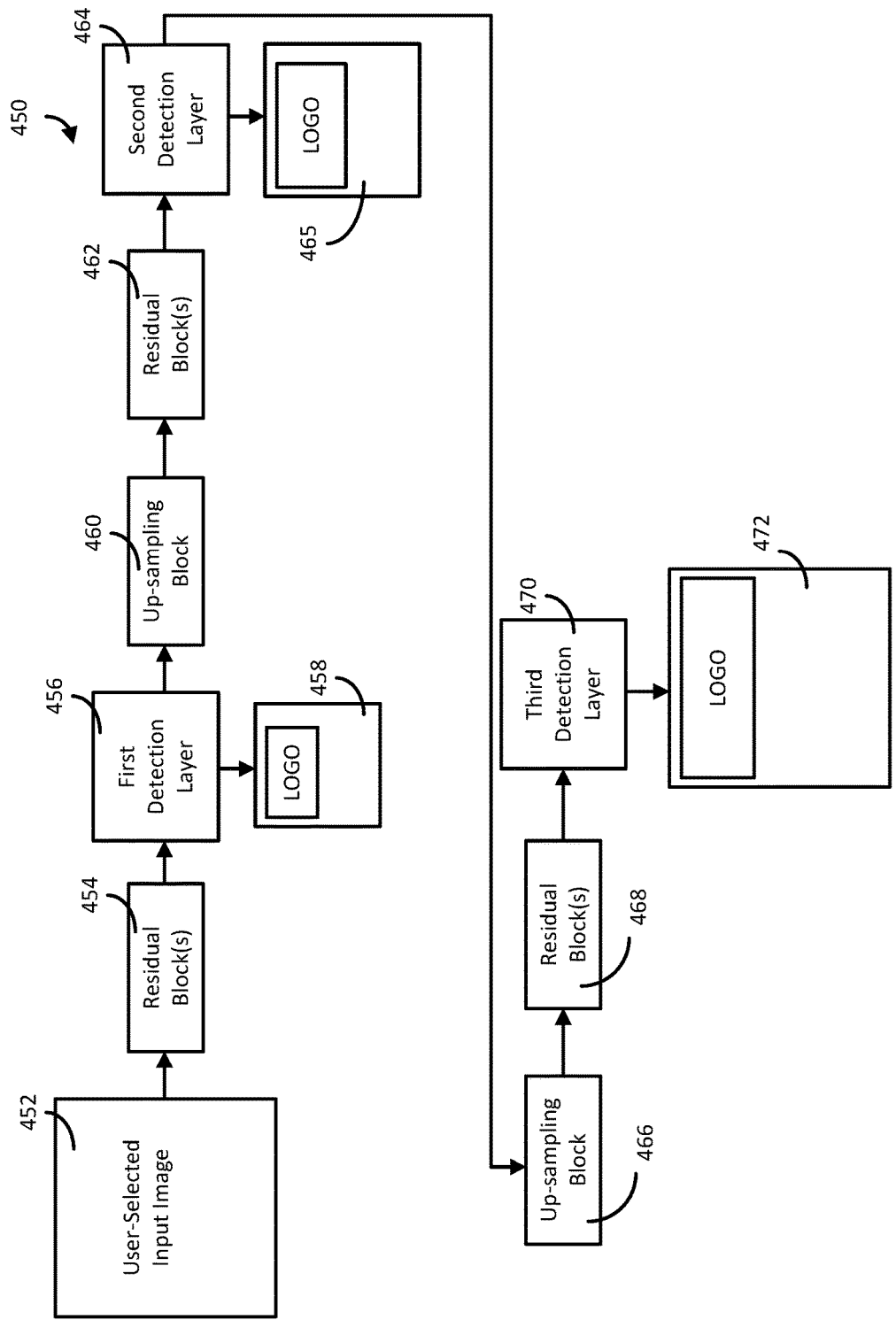

FIG. 4B shows an example of a machine learning architecture 450 for identifying logo information at multiple pixel scales in accordance with one embodiment. As illustrated, a user-selected input image 452 is provided to a first series of residual blocks 454. The first series of residual blocks 454 generate a down-sampled user-selected input image 452 (e.g., by a factor of 32), and provide the down-sampled input to a first detection layer 456. First detection layer 456 performs object detection on the down-sampled image data to generate a first logo identification 458 at a first scale (e.g., the most down-sampled scale). The down-sampled image data is then up-sampled by a first up-sampling block 460 (e.g., by a factor of 2). For example, in an instance in which the first scale was a down-sampling by a factor of 32, first up-sampling block 460 generates image data down-sampled by a factor of 16. The up-sampled image data is passed to a second residual block 462, and then passed to a second detection layer 464, which operates at a second scale (e.g., down-sampled by a factor of 16 in the example described above). Second detection layer 464 generates a second logo identification 465 at the second scale. The image data is then further up-sampled by a second up-sampling block 466 (e.g., by a factor of 2). For example, in an instance in which the second scale was a down-sampling by a factor of 16, second up-sampling block 466 generates image data down-sampled by a factor of 8. The up-sampled image data is passed to a third residual block 468, and then passed to a third detection layer 470, which operates at a third scale (e.g., down-sampled by a factor of 8 in the example described above). Third detection layer 470 generates a third logo identification 472 at the third scale.

In one embodiment, a machine learning model for logo identification is trained using a dataset of training images, for example, that have been annotated to include indications of logos included in the training images. An example dataset is the Logo-32 dataset. In one embodiment, the machine learning model is trained to detect a single class, e.g., whether or not any logo is present in an input image rather than detecting a logo of a particular brand or entity. As a result of training, weights associated with the various residual blocks are determined.

In one embodiment, a template includes text attributes of text included in a user-selected input image. Examples of text attributes include the content of the text, an identification of a font associated with the text, a font size associated with the text, a font color associated with the text, a formatting of the text (e.g., whether the text is all capital letters, all lower-case letters, etc.), or the like. In one embodiment, the text attributes are extracted from the user-selected input image by identifying content of the text (e.g., using optical character recognition techniques) and/or by providing a snapshot of the text content to a trained machine learning model that classifies the text content as associated with a particular font of a group of fonts. In one embodiment, the text attributes are extracted by a font extraction module (e.g., font extraction module 120 of FIG. 1).

Figure 5:
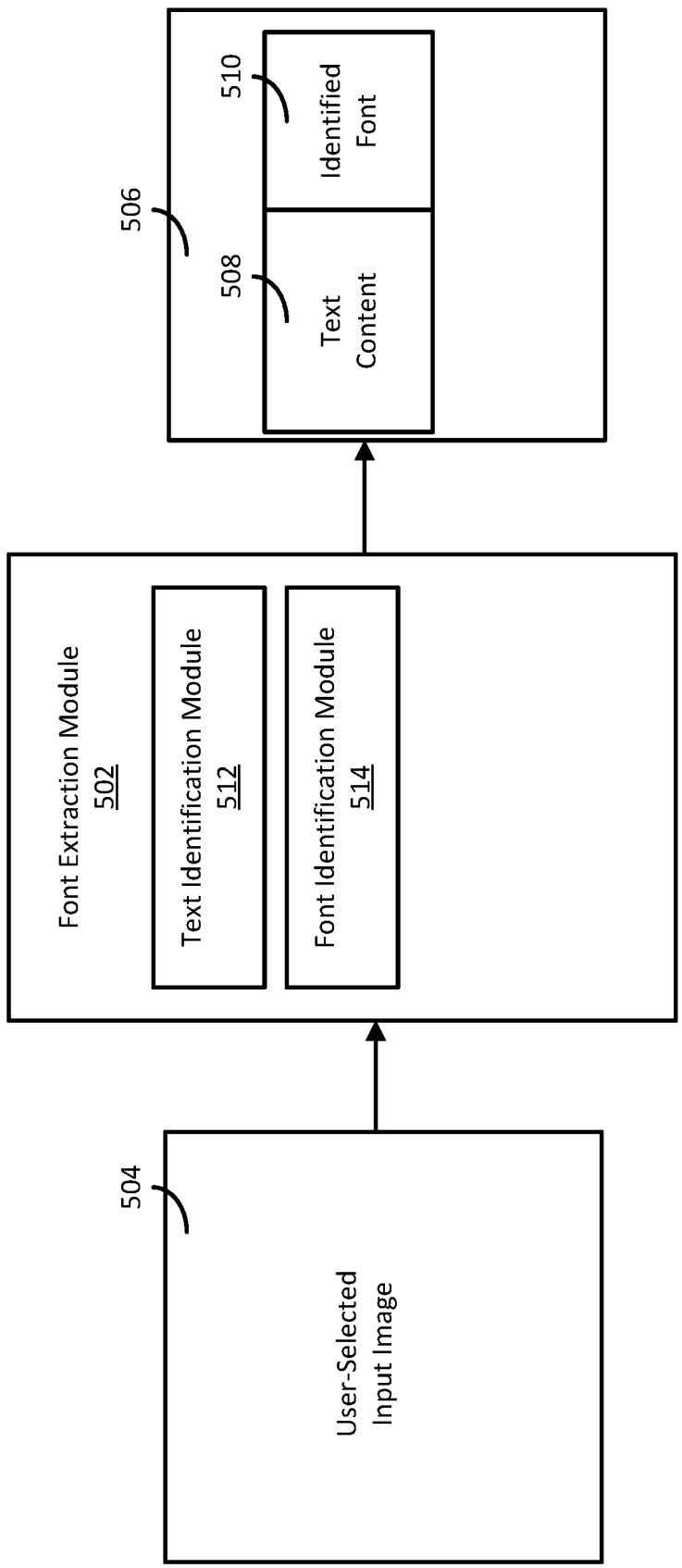
FIG. 5 shows a schematic diagram for use of a font extraction module to identify text information included in an image in accordance with some embodiments.

FIG. 5 shows an example of a font extraction module 502. As illustrated, font extraction module 502 takes, as an input, a user-selected input image 504, and generates, as an output, text attributes 506. Text attributes 506 include text content 508 and an identified font 510. In one embodiment, text attributes 506 include other information, such as a font size, a text format, a text color, etc.

In one embodiment, text content 508 is generated by a text identification module 512. In one embodiment, text identification module 512 pre-processes portions of user-selected input image 504 identified as having text content (e.g., based on an extracted layout, such as that extracted by layout extraction module 116 of FIG. 1). In one example, the portions of user-selected input image 504 identified as having text content are cropped from user-selected input image 504. In one example, the portions of user-selected input identified as having text content image 504 are pre-processed such that, having undergone pre-processing, the pre-processed regions conform to and/or similar to training set data used by one or more machine learning models or algorithms used to extract text attributes. For example, the portions of user-selected input image 504 are pre-processed by superimposing the cropped portion from user-selected input image 504 on a white background and/or resizing the cropped portion. In another example, the portions of user-selected input image 504 are pre-processed by modifying an aspect ratio of the portion including text content. In one embodiment, text identification module 512 uses an OCR algorithm, such as Tesseract, to extract text content 508.

In one embodiment, identified font 510 is determined by a font identification module 514. In one embodiment, font identification module 514 is implemented as a trained machine learning model which takes, as an input, a portion of user-selected input image 504 identified as having text content (e.g., based on an extracted layout, such as that extracted by layout extraction module 116 of FIG. 1). In one example, the trained machine learning model takes, as an input, a cropped portion of user-selected input image 504 that includes text content. In another example, the trained machine learning model takes, as an input, the cropped portion superimposed on a white background. In one embodiment, the trained machine learning model is a residual network (e.g., ResNet, ResNeXT, MobileNetV2, or the like). The trained machine learning model classifies the input as associated with a particular class of a group of classes, where each class corresponds to a different font (e.g., Times New Roman, Arial, Century Gothic, etc.). The group of classes includes any suitable number of different fonts, such as 30 fonts, 40 fonts, 50 fonts, 60 fonts, or the like. In one embodiment, the machine learning model is trained using a training set of cropped images including text content and corresponding ground-truth font labels. In one embodiment, to robustly train the machine learning model, the training set includes cropped images that have been manipulated in some manner, such as having been cropped, flipped, rotated, and/or jittered (e.g., jittered in color, etc.).

In one embodiment, font extraction module 502 operates in parallel on multiple portions of the image that have been identified (e.g., by a layout extraction module) as including text content. For example, in an instance in which two regions of a user-selected input image have been identified as including text content, font extraction module 502 generates text attributes for each of the two regions substantially in parallel, thus speeding up processing. In one example, if identifying text attributes for a particular region takes about 15 seconds, and in which there are 10 regions including text content, serial processing of each of the 10 regions would require 150 seconds, whereas, by processing the regions substantially in parallel, extraction of the text attributes is substantially reduced (e.g., to 30-45 seconds).

Figure 6:
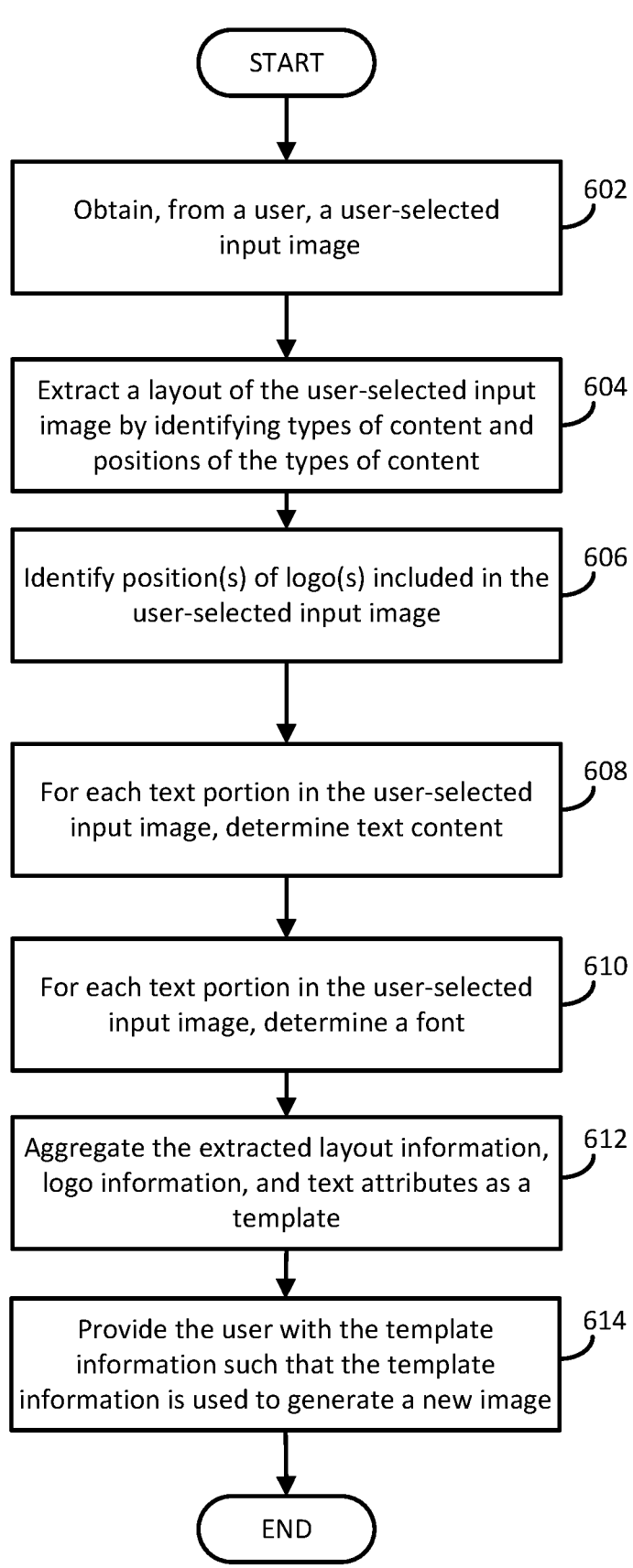
FIG. 6 shows an example of a process for extracting template information from an image in accordance with some embodiments.

FIG. 6 shows an example of a process 600 for generating a template associated with a user-selected input image in accordance with one embodiment. In one embodiment, process 600 is executed by a template extraction module, such as template extraction module 102 of FIG. 1. In one example, blocks of process 600 are executed by a hardware processor, such as a hardware processor of a device (e.g., a server, a user device, or any other suitable device) that generates templates from user-selected input images. In one embodiment, process 600 is executed as a single processing pipeline with certain blocks of process 600 corresponding to different stages of the pipeline. In one embodiment, blocks of process 600 are performed in an order other than what is shown in FIG. 6. In one embodiment, two or more blocks of process 600 are performed substantially in parallel. In one embodiment, one or more blocks of process 600 are omitted.

Process 600 begins at block 602 by obtaining, from a user, a user-selected input image such as a banner image with infographics to convey a certain idea or message. In one embodiment, the user-selected input image is directly provided by the user (e.g., as a JPEG image, as GIF image, as a PNG image, or the like). In one embodiment, a link to the user-selected input image is provided, and process 600 obtains the user-selected input image by accessing the link (e.g., by accessing a link associated with an image provisioning service, by accessing a link associated with a social networking service, by accessing a link associated with a cloud storage service, or the like). In one embodiment, the user-selected input image is obtained via a user interface, such as the user interface shown in and described above in connection with FIG. 2. The user-selected input image has a certain arrangement of contents including images and textual elements.

At block 604, process 600 extracts a layout of the user-selected input image by identifying types of content included in the user-selected input image and positions of the identified types of content included in the user-selected input image. Examples of types of content include blocks of text, images, shapes, and/or background content. In one embodiment, the layout is extracted using a layout extraction module, such as layout extraction module 116 of FIG. 1. In one embodiment, the layout is extracted by performing semantic segmentation on the user-selected input image to generate a segmented image (e.g., using semantic segmentation module 314 shown in and described above in connection with FIG. 3) and determining boundary boxes associated with groups of pixels of the segmented image (e.g., using bounding box module 316 shown in and described above in connection with FIG. 3). In one example, semantic segmentation is performed using an encoder-decoder network. In one example, bounding boxes are determined using a DFS on groups of pixels of the segmented image. In one embodiment, the layout is extracted by performing object identification on the user-selected input image (e.g., using object identification module 318 shown in and described above in connection with FIG. 3) to identify particular objects or classes of objects within the user-selected input image. A process for extracting a layout of the user-selected input image is shown in and described below in connection with FIG. 7.

At block 606, process 600 identifies position(s) of one or more logos included in the user-selected input image. In one embodiment, a logo includes icon, graphic, and/or text content and is associated with a particular brand or entity. In one embodiment, process 600 identifies position(s) of one or more logos included in the user-selected input image using a trained machine learning model. In one example, the trained machine learning model identifies logos in the user-selected input image at multiple pixel scales using the user-selected input image, each corresponding to the user-selected input image down-sampled by a different factor (e.g., by a factor of 32, by a factor of 16, by a factor of 8, or the like), as shown in and described above in connection with FIGS. 4A and 4B. In one embodiment, the logo(s) are identified by a logo extraction module, such as logo extraction module 118 of FIG. 1. A process for identifying logo information associated with one or more logos included in the user-selected input image is shown in and described below in connection with FIG. 8.

At block 608, process 600 determines, for each text portion of the user-selected input image, the content of the text. In one embodiment, process 600 determines the content of the text by performing an OCR technique (e.g., Tesseract) on a cropped portion of the user-selected input image that includes the text to be identified. In one embodiment, the cropped portion is manipulated prior to performing the OCR technique, for example, by superimposing the cropped portion on a white background. In one embodiment, the content of the text is identified by a font extraction module, such as font extraction module 120 of FIG. 1. In one embodiment, the content of the text is identified by a sub-component of the font extraction module, such as by text identification module 512, shown in and described above in connection with FIG. 5.

At block 610, process 600 determines, for each text portion in the user-selected input image, a font associated with the text portion. In one example, the text portion is classified as associated with a particular font from a group of fonts. In one embodiment, the font is identified by providing a cropped portion of the user-selected input image that includes the text portion to a trained machine learning model that classifies the cropped portion of the user-selected input image as associated with the identified font. In one embodiment, the font is identified by a font extraction module, such as font extraction module 120 of FIG. 1. In one embodiment, the font is identified by a sub-component of the font extraction module, such as by font identification module 514, shown in and described above in connection with FIG. 5. It should be noted that, in one embodiment, process 600 extracts other attributes associated with the text, such as a color of the text, a formatting of the text (e.g., whether the text is in all capital letters, whether the text is in all lower-case letters, whether the text is right-justified or left-justified, etc.), or the like. A process for identifying text attributes associated with text included in the user-selected input image is shown in and described below in connection with FIG. 9.

At block 612, process 600 aggregates the extracted layout information, the logo information, and/or the text attributes (e.g., the content of the text, the identified font, a formatting of the text, etc.) as a template, which contains editable regions corresponding to the arrangement of the contents of the input banner image. For example, in one embodiment, process 600 constructs a data structure corresponding to the template, where the data structure includes various fields, each corresponding to a portion of the extracted layout information, the logo information, and/or the text attributes. In one example, a field of the data structure corresponds to a block of text included in the user-selected image. Continuing with this example, in one embodiment, the field corresponding to the block of text includes values or parameters indicative of content of the block of text, a font of the block of text, a position of the block of text, a size of the block of text, formatting associated with the text, or the like, that were extracted from the user-selected image. Hence, the editable regions of the template corresponding to the textual elements are tagged with text attributes extracted from the user-selected image. In another example, a field of the data structure corresponds to an image included in the user-selected image. Continuing with this example, in one embodiment, the field corresponding to the image includes values or parameters indicative of a position of the image within the user-selected input image, a rotation of the image (e.g., 30 degrees clockwise, 50 degrees clockwise, or the like), and/or any other suitable image attributes. Examples of formats of data structures usable to store template information include JSON, XML, or the like.

At block 614, process 600 provides the user with template information to generate a new image having characteristics of the user-selected input image. In one example, the new image has the layout of the user-selected input image, e.g., with the same images, icons, text blocks, etc. positioned at the same locations as the user-selected input image. In another example, the new image has the layout of the user-selected input image and the same background as the user-selected input image. In one embodiment, process 600 provides the template information by constructing an editable structured image using the template generated at block 612. An example of an editable structured image is shown in and described above in connection with FIG. 2. For example, in one embodiment, the editable structured image includes editable regions such as a selectable and/or editable version of images or icons included in the user-selected input image such that a user manipulates the images or icons to form the new image. As another example, the editable structured image includes editable regions such as an editable version of a text block of the user-selected input image to allow a user to edit the text of the text block, change the font of the text block, and/or change a formatting of the text, etc. to form the new image. In other words, the structured image provides a starting point for the user to create a new image based on the characteristics of the user-selected input image.

As mentioned above, process 600 is capable of being performed in a single processing pipeline, meaning that process 600 is performed without having to invoke different applications to perform the different tasks such as layout extraction and text recognition. The integration of the various functionalities described with reference to process 600 in a single processing pipeline has several advantages. For one thing, the user experience is greatly improved because the user only needs to select an input image and issue a single command (e.g., a single click) to have a template generated from the input image. This eliminates the need for the user, for example, to open a segmentation application to extract one region of content, save that region in a file, then open a text recognition application, load the file to perform optical character recognition, save the results, then go back to the segmentation application to extract another region of content, and so on repeatedly to process the different regions of content. Not only is the user experience greatly improved, the single processing pipeline also reduces processing latency by allowing the text and logo extraction modules to process regions in parallel. For example, each text region can take about 15 seconds to process. Serially processing an image with ten text regions can take up to 150 seconds. In contrast, the single processing pipeline is able to process the text regions in parallel and to cut down the processing time of the entire image to just 35-45 seconds in this example.

Figure 7:
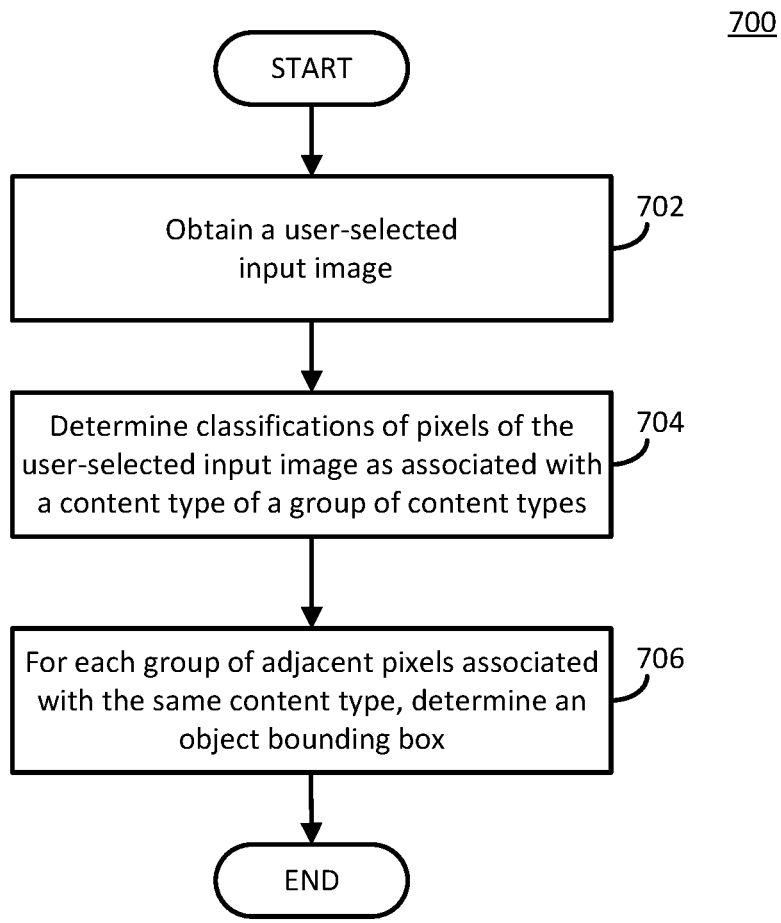
FIG. 7 shows an example of a process for extracting layout information associated with an image in accordance with some embodiments.

FIG. 7 shows an example of a process 700 for extracting a layout associated with a user-selected input image in accordance with one embodiment. In one embodiment, process 700 is executed by a layout extraction module, such as layout extraction module 116 of FIG. 1. An example of a layout extraction module is shown in an described above in connection with FIGS. 3A and 3B. In one embodiment, blocks of process 700 are executed by a hardware processor, such as a hardware processor of a device (e.g., a server, a user device, or any other suitable device) that generates a template associated with a user-selected input image. In one embodiment, blocks of process 700 are executed in an order other than what is shown in FIG. 7. In one embodiment, two or more blocks of process 700 are performed substantially in parallel. In one embodiment, one or more blocks of process 700 are omitted.

Process 700 begins at block 702 by obtaining a user-selected input image. As described above in connection with block 602 of FIG. 6, in one embodiment, the user-selected input image is directly provided by the user (e.g., as a JPEG image, as GIF image, as a PNG image, or the like). In one embodiment, a link to the user-selected input image is provided, and process 700 obtains the user-selected input image by accessing the link (e.g., by accessing a link associated with an image provisioning service, by accessing a link associated with a social networking service, by accessing a link associated with a cloud storage service, or the like). In one embodiment, the user-selected input image is obtained via a user interface, such as the user interface shown in and described above in connection with FIG. 2.

At block 704, process 700 determines classifications of pixels of the user-selected input image as associated with a content type of a group of content types. Examples of content types include text, shapes, images, and/or background. In one embodiment, process 700 determines the classifications of the pixels by performing semantic segmentation on the user-selected input image to generate a segmented image, where each pixel of the segmented image is classified as associated with one of the content types of the group of content types. In one embodiment, semantic segmentation is performed by a semantic segmentation module, such as semantic segmentation module 314 of FIG. 3. In one embodiment, semantic segmentation is performed by providing the user-selected input image to an encoder-decoder network which generates the segmented image. An example of such an encoder-decoder network is shown in and described above in connection with FIG. 3B.

At block 706, process 700 determines an object bounding box for each group of adjacent pixels associated with the same content type. In one embodiment, process 700 determines the object bounding box by performing a DFS on pixels of a segmented image generated by performing semantic segmentation on the user-selected input image (e.g., at block 704). In one example, process 700 traverses the segmented image and, for each pixel of the segmented image, performs a DFS to identify the largest box (e.g., a rectangular box) that has the pixel as a corner of the box. In one embodiment, the uppermost left coordinate and the lowermost right coordinate of the box are identified. In one embodiment, boxes having an area less than a predetermined threshold (e.g., less than 800 pixels, less than 1000 pixels, less than 1200 pixels, etc.) are discarded, thereby yielding a cleaner and/or smoother segmented region, and discarding regions that correspond to errors or artifacts. For example, shadows and pixelations due to poor resolution are excluded from the content regions to yield cleaner bounding boxes. In one embodiment, object bounding boxes are determined by a bounding box module, such as bounding box module 316 of FIG. 3A.

Figure 8:
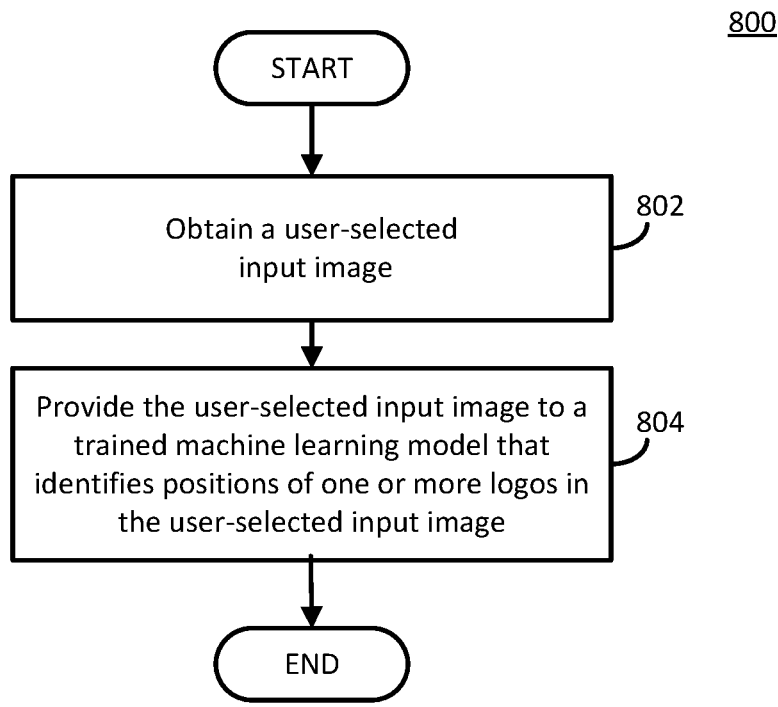
FIG. 8 shows an example of a process for extracting logo information associated with an image in accordance with some embodiments.

FIG. 8 shows an example of a process 800 for identifying a logo included in a user-selected input image in accordance with one embodiment. In one embodiment, process 800 is executed by a logo extraction module, such as logo extraction module 118 of FIG. 1. An example of a logo extraction module is shown in and described above in connection with FIGS. 4A and 4B. In one embodiment, blocks of process 800 are executed by a hardware processor, such as a hardware processor of a device (e.g., a server, a user device, and/or any other suitable device) that generates a template associated with a user-selected input image. In one embodiment, blocks of process 800 are executed in an order other than what is shown in FIG. 8. In one embodiment, two or more blocks of process 800 are performed substantially in parallel. In one embodiment, one or more blocks of process 800 are omitted.

Process 800 begins at block 802 by obtaining a user-selected input image. As described above in connection with block 602 of FIG. 6, in one embodiment, the user-selected input image is directly provided by the user (e.g., as a JPEG image, as GIF image, as a PNG image, or the like). In one embodiment, a link to the user-selected input image is provided, and process 800 obtains the user-selected input image by accessing the link (e.g., by accessing a link associated with an image provisioning service, by accessing a link associated with a social networking service, by accessing a link associated with a cloud storage service, or the like). In one embodiment, the user-selected input image is obtained via a user interface, such as the user interface shown in and described above in connection with FIG. 2.

At block 804, process 800 provides the user-selected input image to a trained machine learning model that identifies positions of one or more logos included in the user-selected input image. In one embodiment, the trained machine learning model is a FCNN. In one example, the trained machine learning model identifies logos within the user-selected input image at multiple pixel scales, where each pixel scale corresponds to a different down-sampling factor applied to the user-selected input image. An example of such a machine learning model architecture is YOLOv3. Identification of logos at multiple pixel scales is described above in connection with FIG. 4B. It should be noted that, in some cases, there are no logos included in the user-selected input image. In such cases, process 800 provides an indication that there are no logos included in the user-selected input image.

Figure 9:
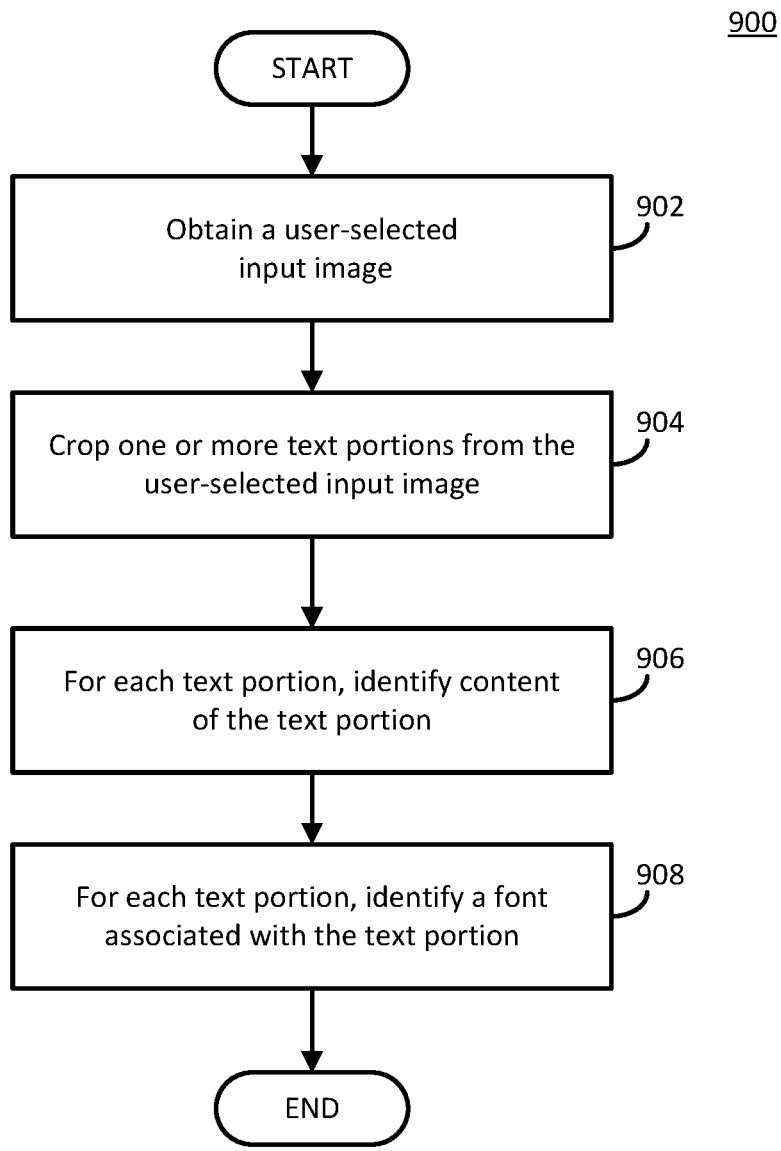
FIG. 9 shows an example of a process for extracting text information associated with an image in accordance with some embodiments.

FIG. 9 shows an example of a process 900 for identifying text attributes of text content included in a user-selected input image in accordance with one embodiment. In one embodiment, the text attributes include content of the text (e.g., characters included in the text content), a font and/or a font family associated with the text content (e.g., Times New Roman, Arial, or the like), a color associated with the text content, a size of the text content, a positioning of the text content (e.g., left-justified, right-justified, or the like), and/or a formatting of the text content (e.g., all-capitalized, all lower-case, or the like). In one embodiment, process 900 is executed by a font extraction module, such as font extraction module 120 of FIG. 1. An example of use of a font extraction module is shown in an described above in connection with FIG. 5. In one embodiment, blocks of process 900 are executed by a hardware processor, such as a hardware processor of a device (e.g., a server, a user device, and/or any other suitable device) that generates a template associated with a user-selected input image. In one embodiment, blocks of process 900 are executed in an order other than what is shown in FIG. 9. In one embodiment, two or more blocks of process 900 are performed substantially in parallel. In one embodiment, one or more blocks of process 900 are omitted.

Process 900 begins at block 902 by obtaining a user-selected input image. As described above in connection with block 602 of FIG. 6, in one embodiment, the user-selected input image is directly provided by the user (e.g., as a JPEG image, as GIF image, as a PNG image, or the like). In one embodiment, a link to the user-selected input image is provided, and process 900 obtains the user-selected input image by accessing the link (e.g., by accessing a link associated with an image provisioning service, by accessing a link associated with a social networking service, by accessing a link associated with a cloud storage service, or the like). In one embodiment, the user-selected input image is obtained via a user interface, such as the user interface shown in and described above in connection with FIG. 2.

At block 904, process 900 crops one or more text portions from the user-selected input image. In one embodiment, the text portions are identified based on a layout extracted from the user-selected input image (e.g., by a layout extraction module, such as layout extraction module 116 of FIG. 1, and/or using the techniques described above in connection with FIGS. 3A, 3B, and/or 7). In one embodiment, process 900 superimposes the cropped text portion on a solid-colored background (e.g., a white background). In one embodiment, process 900 resizes the cropped text portion prior to superimposing the cropped text portion on the solid-colored background.

At block 906, process 900 identifies, for each text portion, the content of the text portion. For example, in one embodiment, process 900 identifies alphanumeric characters and/or other symbols included in the text portion. In one embodiment, process 900 identifies the content of the text portion by providing the cropped text portion, or the cropped text portion superimposed on a plain or solid-colored background (e.g., a white background), to an algorithm that performs OCR on the cropped text portion. In one example, process 900 uses Tesseract to perform OCR on the cropped text portion. In one embodiment, the aspect ratio of text to background is manipulated to a fixed value (e.g., 1:8) that ensures that the text occupies an optimized portion of the background for performing OCR. Superimposing text on a plain background and manipulation of aspect ratio increases an accuracy of identification of text attributes and decreases speed required to identify the text attributes by aligning the input provided to the machine learning models with the training samples the machine learning models were trained on. In one embodiment, process 900 identifies the content of the text portion using a text identification module, such as text identification module 512 of FIG. 5.

At block 908, process 900 identifies, for each text portion, a font associated with the text portion. For example, in one embodiment, process 900 classifies the text portion as associated with a particular font of a group of known fonts. In one embodiment, process 900 identifies the font associated with the text portion by providing the cropped text portion, or the cropped text portion superimposed on a solid-colored background, to a trained machine learning model that classifies the cropped text portion as associated with the identified font. In one embodiment, machine learning model has a residual network architecture. Examples of such machine learning models include ResNet, ResNeXT, and/or MobileNetV2. In one embodiment, process 900 identifies the font associated with the text portion using a font identification module, such as font identification module 514 of FIG. 5.

It one embodiment, process 900 identifies other text attributes associated with the text portion. For example, in one embodiment, process 900 identifies a color associated with the text. In one example, process 900 identifies a Red-Blue-Green (RGB) value of the text. As another example, in one embodiment, process 900 identifies a text formatting style associated with the text. In one example, process 900 determines whether the text is all capitalized or all lower-case by determining whether characters identified at block 902 correspond to all capital letters, or conversely, all lower-case letters. In another example, process 900 identifies a text justification (e.g., right-justified, left-justified, and/or center-justified) by comparing positions of the text to a border area associated with the text portion. As a more particular example, in an instance in which the left-most characters are aligned with a left-most edge of a boundary of the text portion (e.g., as indicated in an extracted layout), process 900 determines that the text is left-justified. As yet another example, in one embodiment, process 900 determines a font size associated with the text. In one example, process 900 determines the font size based at least in part on a size (e.g., a height in pixels, a width in pixels, and/or any other suitable size metric) of characters identified in the text portion.

Figure 10:
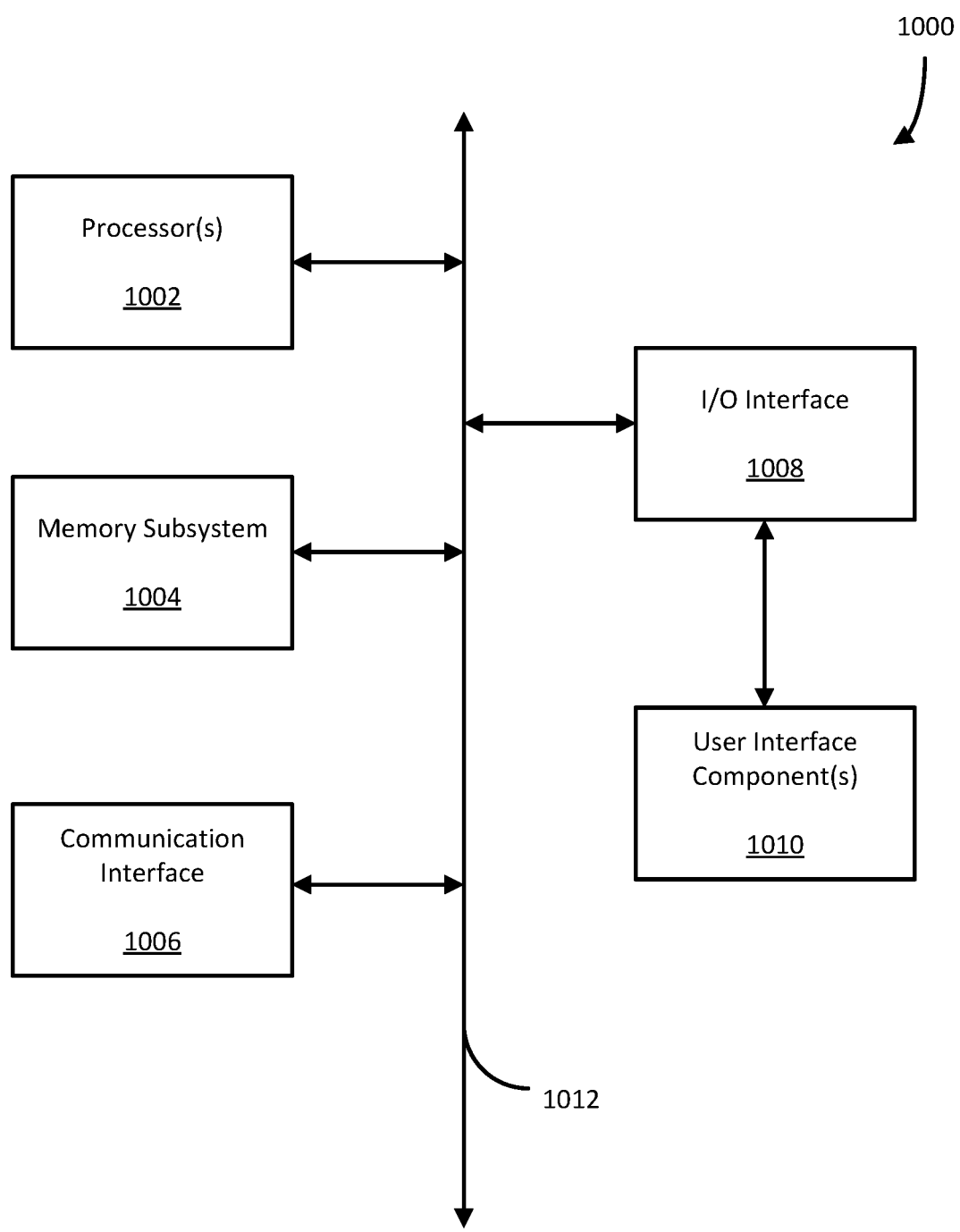
FIG. 10 shows a schematic diagram of an example computing device for implementing the methods, systems, and techniques described herein in accordance with some embodiments.

FIG. 10 shows a schematic diagram of components of a computing device 1000 that is implemented in a computing system in accordance with one embodiment. As illustrated, computing device 1000 includes a bus 1012 that directly or indirectly couples one or more processors(s) 1002, a memory subsystem 1004, a communication interface 1006, an input/output (I/O) interface 1008, and/or one or more user interface components 1010. It should be noted that, in one embodiment, various other components are included in a computing device that are not shown in FIG. 10, and/or one or more components shown in FIG. 10 are omitted.

In one embodiment, computing device 1000 includes or is coupled to a memory subsystem 1004. Memory subsystem 1004 includes a computer-readable medium (e.g., non-transitory storage medium) or a combination of computer-readable media. Examples of computer-readable media include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In one embodiment, the computer-readable media includes non-volatile memory, volatile memory, or a combination thereof. In one embodiment, memory subsystem 1004 also includes one or more hardware devices such as a solid-state memory, one or more hard drives, one or more optical disk drives, or the like. In one embodiment, memory subsystem 1004 stores content files such as text-based files, audio files, image files, and/or video files, etc. In one embodiment, the content files include documents, pictures, photos, songs, podcasts, movies, etc. In one embodiment, memory subsystem 1004 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 1002, or processor(s) of another computing device communicatively coupled to computing device 1000) to perform various operations or functions such as those described with reference to FIGS. 5-9. In one embodiment, a computer program product is referred to as a non-transitory computer readable medium storing or comprising instructions to perform certain operations or functions. Examples of a computer program product include firmware, software driver, operating system, or software application. Examples of a software application include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In one embodiment, a computer program product such as any of the example software application are implemented using one or more neural network or machine learning models. For example, one or more neural network or matching learning models are trained using computing device 1000 (or a computing system that includes computing device 1000). Furthermore, in one embodiment, computing device 1000 (or a computing system include computing device 1000) executes the one or more neural network or machine learning models as part of the computer program product to perform inference operations. It should be noted, in one embodiment, the neural network or matching learning model(s) are trained using a computing device or system that is the same as, overlaps with, or is separate from the computing device or system performing inference operations.

Communication interface 1006 is used by computing device 1000 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In one embodiment, communication interface 1006 utilizes various drivers, wireless communication circuitry, network interface circuitry, or the like to enable communication via various communication networks.

I/O interface 1008 includes various drivers and/or hardware circuitry for receiving input from various input devices, providing output to various output devices, or exchanging input/output with various input/output devices. Examples of devices coupled to I/O interface 1008 include peripheral devices such as a printer, a docking station, a communication hub, a charging device, etc. In one embodiment, some devices coupled to I/O interface 1008 are used as user interface component(s) 1010. In one example, a user operates input elements of user interface component(s) 1010 to invoke the functionality of computing device 1000 and/or of another device communicatively coupled to computing device 1000; a user views, hears, and/or otherwise experiences output from computing device 1000 via output elements of user interface component(s) 1010. Some user interface component(s) 1010 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Accordingly, techniques for generating semantically-guided templates from image content have been described, where the templates are usable to generate a new image having style characteristics based on the image content from which the templates are generated. In one embodiment, a user-selected input image (e.g., a banner) is obtained. In one example, the user-selected input image is a flat image (e.g., an image that lacks content layer information). In one embodiment, the user-selected input image includes various types of content, such as blocks of text, icons, graphics, images, shapes, backgrounds, or the like, that, in aggregate, correspond to style characteristics to be emulated. In one embodiment, information is extracted from the image, such as layout information, text attributes associated with text included in the image, and/or logo information. For example, layout information such as positions of content of various types within the user-selected input image are extracted. As a more particular example, in one embodiment, the layout information indicates positions of blocks of text within the user-selected input image, positions of various icons, images, and/or graphics within the user-selected input image, whether particular content items are foreground or background content, or the like. As another example, text attributes associated with text blocks included in the user-selected input image are determined, where the text attributes indicate information such as content of the text blocks, fonts associated with the text blocks, formats of the text blocks (e.g., text justification, capitalization style, etc.), text colors, or the like. As yet another example, logo information associated with one or more logos included in the user-selected input image is identified, where the logo information includes positions of the one or more logos. In one embodiment, a template is generated based on the layout information, the text attributes, and/or the logo information. For example, to enhance the template, regions in the template corresponding to text regions are tagged with the text attributes determined from the text block processing. In one embodiment, a user (e.g., the user who provided the user-selected input image) is able to generate a new image having at least a portion of characteristics associated with the user-selected input image from the template. For example, in one embodiment, the template is used to provide an editable structured image having the layout of the user-selected input image and the content of the user-selected input image, where individual elements (e.g., an individual logo, an individual block of text, an individual image, etc.) within the structured image are editable by the user to create the new image. In this manner, the user-selected input image serves as a starting point to create a new image based on the user-selected input image. In one embodiment, the template is stored in a data structure of a data exchange format (e.g., a JavaScript object nation (JSON) structure, an extended markup language (XML) structure, or the like). In one embodiment, the data structure is stored (e.g., in a local memory or in the cloud) to allow the template to be used subsequently.

In one embodiment, a semantically meaningful template is generated from a user-selected input image via a single processing pipeline that is capable of extracting layout information, text attributes, and/or logo information from the user-selected input image. The single processing pipeline utilizes invocation of a single application to generate the semantically meaningful template. In one embodiment, the single processing pipeline advantageously utilizes results from one stage of the single processing pipeline in a subsequent state of the single processing pipeline, thus allowing both a reduction in the use of computational resources, as well as for correlation of semantic information identified over sequential stages of the single processing pipeline. For example, in the single processing pipeline, region and layout information can be extracted at one stage to provide a coarse template, and text attributes and logos are identified in a subsequent stage, which are correlated with the layout information to generate a semantically-guided template. By identifying a region of the user-selected input image that includes text content as part of the layout information, machine learning models that extract additional text attributes (e.g., content of the text, a font, formatting, etc.) are applied to only those of the regions that includes text content rather than to the entire user-selected image. In one embodiment, the regions that include text content are manipulated to a formatting suitable for extracting additional text attributes (e.g., by superimposing them on a plain background such as a white background). By limiting extraction of text attributes to the regions of the user-selected image identified as including text content, overall processing is substantially sped up by processing the regions in parallel. For example, an image having ten text regions takes about 150 seconds to process when each text region is selected and provided to a text processing application serially. Using the single pipeline approach, the entire process takes about 35-45 seconds because once the layout has been extracted, the text regions are processed in a parallel to extract text attributes.

In one embodiment, different blocks of the single processing pipeline are also performed substantially in parallel, thus yielding a reduction in time to generate a semantically-guided template. For example, after a coarse template is generated that indicates, for example, locations of image content, text content, etc., more detailed attributes are extracted by different blocks or modules that execute in parallel. In one example, logo information is extracted substantially in parallel with text information (e.g., text attributes, such as text content, font, formatting, or the like). Moreover, in one embodiment, intermediary results of blocks or modules of the single processing pipeline are accessible, thereby allowing user corrections to be implemented in a particular pipeline stage and propagated to other stages. In one example, a module that extracts or identifies text attributes of text content receives the benefit of improvements made to a layout extraction module that generates a coarse template based upon which the text attributes are identified.

Examples of various functions that the single processing pipeline is able to perform includes: (i) extracting layout information by providing the user-selected input image to a trained machine learning model that performs semantic segmentation on the user-selected input image to classify pixels of the user-selected input image as belonging to particular types of content; (ii) generating bounding boxes for the segmented image using, for example, a depth first search (DFS); (iii) extracting text attributes by cropping portions of the user-selected input image; (iv) identifying content of text portions by performing optical character recognition (OCR) on the cropped portions of the user-selected input image; (v) identifying a font associated with a text portion by providing a cropped portion of the user-selected input image to a trained machine learning model that classifies the cropped portion to a particular font (e.g., Times New Roman, Arial, Century Gothic, or the like); and (vi) extracting logo information by providing the user-selected input image to a trained machine learning model that identifies positions of logos included in the user-selected input image. In one embodiment, such a machine learning model identifies logos at multiple pixel scales, where each pixel scale corresponds to a different level of down-sampling of the user-selected input image, thereby allowing logos of different sizes to be identified within the user-selected input image.

By using a single processing pipeline (meaning that different applications are not invoked to process the user-selected input image to generate the template), the image/template data does not have to be copied to or from different memory spaces allocated for different applications. Eliminating such memory accesses and invocations of different applications reduces the processing latency and speeds up execution time. This also allows a more efficient use of the system's memory and computing resources. Moreover, utilizing results from one stage of the processing pipeline to correlate with features extracted from another stage of the pipeline allows for learning of semantically meaningful information from the user-selected image. For example, rather than merely identifying a type of object and/or a location of an object within a user-selected image, the techniques described herein further identify text attributes presented in connection with objects, whether a particular object is part of a logo, etc. By extracting both visual and textual information associated with a user-selected image at various levels of feature extraction and correlating them with the overall layout, style characteristics of the user-selected image are identified, that in aggregate, produce an aesthetic and effective infographic. These style characteristics are then emulated in an editable template.

Various embodiments are described herein which are intended to be illustrative. Alternative embodiments may be apparent to those of ordinary skill in the art without departing from the scope of the disclosure. In one example, one or more features from one embodiment are combined with another embodiment to form an alternative embodiment. In another example, one or more features are omitted from an embodiment to form an alternative embodiment without departing from the scope of the disclosure. Additionally, it should be noted that, in some implementations, certain features described herein are utilized without reference to other features described herein.

With reference to the various processes described above, it should be understood that the order in which operations are performed is not limited to the order described herein. Moreover, in some embodiments, two or more operations are performed concurrently and/or substantially in parallel. In some embodiments, what is described as a single operation is split into two or more operations (e.g., performed by the same device, performed by two or more different devices, etc.). In some embodiments, what is described as multiple operations is combined into a single (e.g., performed by the same device, etc.). Descriptions of various blocks, modules, or components as distinct should not be construed as requiring that the blocks, modules, or components be separate (e.g., physically separate) and/or perform separate operations. For example, in some implementations, two or more blocks, modules, and/or components are merged. As another example, a single block, module, and/or components is split into multiple blocks, modules, and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, and C" should be understood to mean {A}, {B}, {C}, {A, B}, {A, C}, {B, C}, or {A, B, C}.

The invention claimed is:

1. A method for generating a template from an input banner image, the method comprising:
   receiving, from a user via a user interface, an indication of the input banner image to be emulated, the input banner image having an arrangement of contents including images and textual elements;
   extracting, using a first stage of a single processing pipeline, layout information of the input banner image, the layout information including a position and a content type of each of the contents in the input banner image; providing the layout information to a second stage of the single processing pipeline;
   extracting, using the second stage of the single processing pipeline, text attributes from the textual elements of the input banner image by superimposing each region of textual elements on a plain background to form modified regions of textual elements and processing the modified regions of textual elements in parallel, wherein the text attributes of a textual element includes at least a font of text used in the textual element, and wherein each modified region of textual elements has been modified at least by superimposing the corresponding region of textual elements on the plain background to correspond to training data used by a model in the second stage of the single processing pipeline;
   generating, using a third stage of the single processing pipeline, the template having an arrangement of editable regions corresponding to the arrangement of the contents of the input banner image; and
   modifying the template by tagging the textual elements of the editable regions with corresponding text attributes from the input banner image.

2. The method of claim 1, wherein the content type of a content in the input banner image is selected from a set of content types including an image content type, a text content type, and a shape content type.

3. The method of claim 1, wherein the template is stored in a data structure of a data exchange format indicating layout information of the editable regions.

4. The method of claim 1, wherein the text attributes further indicate at least one of: a color of the text, a size of the text, or a formatting of the text used in the textual element.

5. The method of claim 1, wherein the input banner image is a flat image that lacks content layer information.

6. The method of claim 1, further comprising identifying, using a fourth stage of the single processing pipeline, a position of a logo included in the input banner image, and modifying the template by adding an editable logo region corresponding to the position of the logo in the input banner image.

7. A non-transitory computer-readable medium comprising instructions that, when executed by at least one processor, cause the processor to perform operations to generate a template from an input banner image, the operations comprising:
   receiving, from a user via a user interface, an indication of the input banner image to be emulated, the input banner image having an arrangement of contents including images and textual elements;
   extracting, using a first stage of a single processing pipeline, layout information of the input banner image, the layout information including a position and a content type of each of the contents in the input banner image; providing the layout information to a second stage of the single processing pipeline;
   extracting, using the second stage of the single processing pipeline, text attributes from the textual elements of the input banner image by superimposing each region of textual elements on a plain background to form modified regions of textual elements and processing the modified regions of textual elements in parallel, wherein the text attributes of a textual element includes at least a font of text used in the textual element, and wherein each modified region of textual elements has been modified at least by superimposing the corresponding region of textual elements on the plain background to correspond to training data used by a model in the second stage of the single processing pipeline;
   generating, using a third stage of the single processing pipeline, the template having an arrangement of editable regions corresponding to the arrangement of the contents of the input banner image; and
   modifying the template by tagging the textual elements of the editable regions with corresponding text attributes from the input banner image.

8. The non-transitory computer-readable medium of claim 7, wherein the content type of a content in the input banner image is selected from a set of content types including an image content type, a text content type, and a shape content type.

9. The non-transitory computer-readable medium of claim 7, wherein the template is stored in a data structure of a data exchange format indicating layout information of the editable regions.

10. The non-transitory computer-readable medium of claim 7, wherein the text attributes further indicate at least one of: a color of the text, a size of the text, or a formatting of the text used in the textual element.

11. The non-transitory computer-readable medium of claim 7, wherein the input banner image is a flat image that lacks content layer information.

12. The non-transitory computer-readable medium of claim 7, wherein the operations further comprise identifying, using a fourth stage of the single processing pipeline, a position of a logo included in the input banner image, and modifying the template by adding an editable logo region corresponding to the position of the logo in the input banner image.

13. A computing system for generating a template from an input banner image, comprising:
   one or more processors; and
   a computer-readable storage medium, coupled with the one or more processors, having instructions stored thereon, which, when executed by the one or more processors, cause the one or more processors to perform operations comprising:
      receiving, from a user via a user interface, an indication of the input banner image to be emulated, the input banner image having an arrangement of contents including images and textual elements;

extracting, using a first stage of a single processing pipeline, layout information of the input banner image, the layout information including a position and a content type of each of the contents in the input banner image; providing the layout information to a second stage of the single processing pipeline;

extracting, using the second stage of the single processing pipeline, text attributes from the textual elements of the input banner image by superimposing each region of textual elements on a plain background to form modified regions of textual elements and processing the modified regions of textual elements in parallel, wherein the text attributes of a textual element includes at least a font of text used in the textual element, and wherein each modified region of textual elements has been modified at least by superimposing the corresponding region of textual elements on the plain background to correspond to training data used by a model in the second stage of the single processing pipeline;

generating, using a third stage of the single processing pipeline, the template having an arrangement of editable regions corresponding to the arrangement of the contents of the input banner image; and modifying the template by tagging the textual elements of the editable regions with corresponding text attributes from the input banner image.

14. The computing system of claim 13, wherein the content type of a content in the input banner image is selected from a set of content types including an image content type, a text content type, and a shape content type.

15. The computing system of claim 13, wherein the template is stored in a data structure of a data exchange format indicating layout information of the editable regions.

16. The computing system of claim 13, wherein the text attributes further indicate at least one of: a color of the text, a size of the text, or a formatting of the text used in the textual element.

17. The computing system of claim 13, wherein the input banner image is a flat image that lacks content layer information.

18. The computing system of claim 13, wherein the operations further comprise identifying, using a fourth stage of the single processing pipeline, a position of a logo included in the input banner image, and modifying the template by adding an editable logo region corresponding to the position of the logo in the input banner image.

* * * * *